(12) United States Patent
Lau et al.

(10) Patent No.: US 8,341,669 B2
(45) Date of Patent: Dec. 25, 2012

(54) SYSTEMS AND METHODS FOR CONTROLLING AN ELECTRONIC DEVICE

(75) Inventors: Kam Ming Lau, Yuen Long (HK); Chi Kwong So, Tseung Kwan O (HK); Man Fai Tam, Lamtin (HK)

(73) Assignee: United Video Properties, Inc., Santa Clara, CA (US)

( * ) Notice: Subject to any disclaimer, the term of this patent is extended or adjusted under 35 U.S.C. 154(b) by 398 days.

(21) Appl. No.: 12/788,070

(22) Filed: May 26, 2010

(65) Prior Publication Data

US 2011/0292299 A1    Dec. 1, 2011

(51) Int. Cl.
*H04N 5/445* (2011.01)
(52) U.S. Cl. .............. 725/39; 725/10; 725/52; 725/153; 348/734
(58) Field of Classification Search .................... 725/10, 725/39, 52, 153; 348/734
See application file for complete search history.

(56) References Cited

U.S. PATENT DOCUMENTS

2010/0182518 A1* 7/2010 Kirmse et al. ................ 348/836

* cited by examiner

*Primary Examiner* — Dominic D Saltarelli
*Assistant Examiner* — Sumaiya A Chowdhury
(74) *Attorney, Agent, or Firm* — Ropes & Gray LLP

(57) ABSTRACT

The invention, in one embodiment, is directed to a controller apparatus for controlling an electronic device by sensing and processing a user's interactions with an object and, particularly, for controlling and interacting with a media guidance application implemented on an interactive user equipment device. The controller apparatus may include a platform, a liquid container, and a stirring rod. The platform may include sensors of various kinds for detecting a user's interactions with any one of the components of the user interface system. The controller apparatus may also include sensors for sensing environmental conditions and use the sensed conditions to interact with the media guidance application or any other applications or electronic devices.

51 Claims, 14 Drawing Sheets

SYSTEMS AND METHODS FOR CONTROLLING AN ELECTRONIC DEVICE

BACKGROUND OF THE INVENTION

The invention generally relates to systems and methods for controlling an electronic device. More particularly, the invention relates to a controller that supports user control of an interactive user equipment system.

An interactive user equipment system allows a user to access information available on one or more electronic devices connected to an interactive user equipment system. In particular, a media guidance application, which is typically located at a user set-top box, allows a user to navigate through a wide variety of media content accessible by the user equipment system.

Typically, a user interacts with a media guidance application via a user input device, such as a remote controller. However, remote controllers include numerous push-down buttons with each dedicated to control one feature of the interactive user application. For example, a conventional remote controller may have buttons dedicated to pause an on-demand show, increase/decrease volume, increment/decrement a channel, turn the device on/off, mute, etc.

A typical remote controller for controlling an electronic device, such as a television system or cable set-top box, often has a large number of buttons, many of which are rarely used by a viewer. Therefore, there exists a need for a controller that more efficiently supports a user's control needs.

As existing remote controllers typically have complex button arrangements where users often find it difficult to remember what each of the buttons controls, there also exists a need for a more intuitive and simple remote controller system that enables a user to control one or more operations of an electronic device.

Furthermore, existing remote controllers are often simple input devices not capable of anticipating certain user behavior. Accordingly, there also exists a need for a controller capable of anticipating certain user control inputs.

Finally, existing electronic device controllers, such as typical remote controllers, are stand-alone devices that often require a user to cease performing a particular activity in order to operate the remote controller. Accordingly, there exists a need for a controller that can enable a user to perform more than one activity, such as controlling the operation of an electronic device and performing another activity concurrently.

SUMMARY OF THE INVENTION

The invention, in various embodiments, addresses deficiencies in the prior art by providing systems, methods, and devices for controlling an electronic device based on a user's interactions with another item or object. The systems and devices may be configured to detect a user's interactions with a number of items commonly found in various settings such as a user's home or office. Such items may include a tool, utensil, household item, instrument, appliance and the like. A user's interactions with an item may be configured to control a plurality of devices such as a television equipment system, a phone, a stove, a computer, etc. The present application, in the following description, refers to systems and methods directed to controlling the operation of an electronic device by monitoring a user's interactions with a beverage container.

For the beverage container example, an interface may be employed to monitor various conditions of the beverage container, such as its position, movement, weight, temperature, or whether it emanates one or more sounds. The user of the beverage container may also interface with an electronic system such as a personal computer (PC) and/or interactive program guide. Thus, certain interactions by the user with the beverage container may be used to manipulate an operation of the electronic device. For example, the user may stir the liquid in the container in a clockwise direction to scroll up a list of programs displayed in a program guide. The user may stir the liquid in a counter-clockwise direction to scroll down the list of programs. A user may also tap the liquid container using an object to 'click' or 'select' an option. A number of interactions and/or conditions of the item, in this case the beverage container, may be monitored and used to control an electronic device.

The present application describes, in certain embodiments, an intuitive, simplified, and intelligent controller interface and/or system that enables a user to perform certain everyday manipulations of an existing item while also enabling the user to control an operation of an electronic device.

In one aspect, a remote control apparatus for controlling an electronic device is provided. The remote control apparatus may comprise a platform, a stirring rod, and a controller. The platform may be used to support a liquid container. The stirring rod may be used to allow a user to stir a liquid in the liquid container. The controller may include at least one sensor for sensing a condition of at least one of the stirring rod and the container. The controller may also include a communications interface for sending control data to the electronic device. Furthermore, the controller may include a processor that may communicate with a sensor and the communications interface. The processor may be configured to receive sensor data from the sensor, process the sensor data into the control data, and send the control data to the communications interface.

In one configuration, the platform includes a portion of the controller and a coaster. The platform may include a top surface in communications with the at least one sensor. The at least one sensor may include one of a reed relay, magnetic sensor, hall effect sensor, acoustic sensor, a pressure sensor, a weight sensor, an accelerometer, a proximity sensor, an optical sensor, an temperature sensor, and a location sensor. The control data, as processed by the processor for controlling an operation of the electronic device, may be based on pressure data, acoustic data, position data, location, movement data, weight data, volume data, and/or orientation data associated with at least one of the container and the stirring rod. The communications interface may include a wireless interface and/or a wired interface. The wireless interface may include an infrared interface. The sensor may include a microphone for detecting a sound generated by a user contacting the stirring rod with another object. The container may include a cup and the sensor may be configured to sense the amount of liquid in the cup. The control data as described above may include information based on the amount of liquid in the cup.

In another aspect, a user interface system for controlling an electronic device may comprise a sensor for sensing a user's interactions with a beverage container and a processor for converting the user's interactions into control information for controlling an operation of the electronic device. The electronic device may include an interactive program guide. In one configuration, a portion of the user interface system may be included in the electronic device. In another configuration, the user interface system may be located remotely from and in communication with the electronic device. The user interface system may communicate with the electronic device wirelessly. A user's interactions as sensed by the sensor, may include at least one drinking from the container, lifting the container, stirring the beverage clockwise, stirring the beverage counter-clockwise, tapping the container, tapping the container with a stirring rod, the temperature of the beverage, amount of beverage in the container, the weight of the container, and a change in a condition of the container. Each of the user's interactions may be associated with a selected operation of the electronic device such that the electronic device operation is in response to each of the user's interactions. The platform may include a sensor and be configured to support the beverage container. The platform may further include a coaster.

In a further respect, an interactive program guide system may comprise a user equipment device configured for receiving programs and program guide information and for receiving user control information. The system may further comprise a display for displaying the program guide information and a first remote controller. The first remote controller may include at least one sensor for sensing a user's interactions with a beverage container, and a processor for generating the user control information in response to the user's interactions. The first remote controller may further include a communications interface for sending the user control information to the user equipment device. In one configuration, the interactive program guide system may further comprise a second remote controller for receiving user inputs via a user interface and may send user control information to the user equipment device. The first remote controller may further include a platform for supporting the liquid container and a stirring rod for stirring a liquid in the beverage container.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

Figure 1:
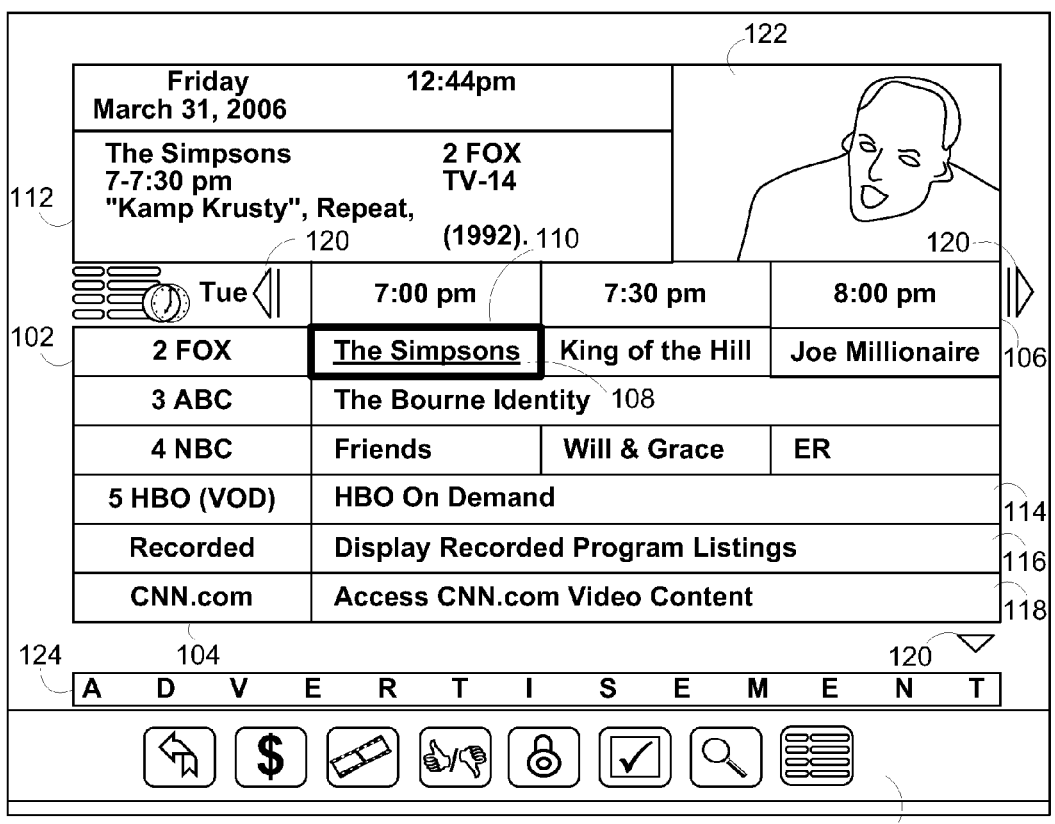
FIGS. 1 and 2 show illustrative display screens that may be used to provide media guidance application listings in accordance with one embodiment of the invention.

The invention, in various embodiments, addresses deficiencies in the prior art by providing systems, methods, and devices for controlling an electronic device based on a user's interactions with another item or object. The item may be a tool, utensil, household item, instrument, appliance, device, and the like. Any item that a person typically manipulates at home, work, or another setting may be used to manipulate the operation of an electronic device. By way of example, the present application, in the following description, refers to systems and methods directed to controlling the operation of an electronic device by monitoring a user's interactions with a beverage container. However, it should be understood by those of ordinary skill that the following exemplary description may be applied to controlling the operation of a wide variety of electronic devices.

The types of electronic devices that can be controlled may include, without limitation, a computer system, a consumer electronic device, an appliance, a communications device, an interactive programming guide, a television, a music player, a video player, media recorder, media player, entertainment system, vehicle, a monitoring system, an environmental control system, an information system, an electronic interface to a second system, and the like, including an application running on any one of the electronic devices. The types of items that a user can manipulate may include, without limitation, a tool, utensil, instrument (musical, writing, etc. . . . ), apparel, and the like. A cup, beverage container, bowl, fork, knife, stirring rod, straw, or spoon may be considered a type of tool or utensil used for eating and/or drinking.

One type of device and/or application that is readily adaptable to utilizing a controller based on manipulation of an item by a user is an interactive media guidance application. The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 2:
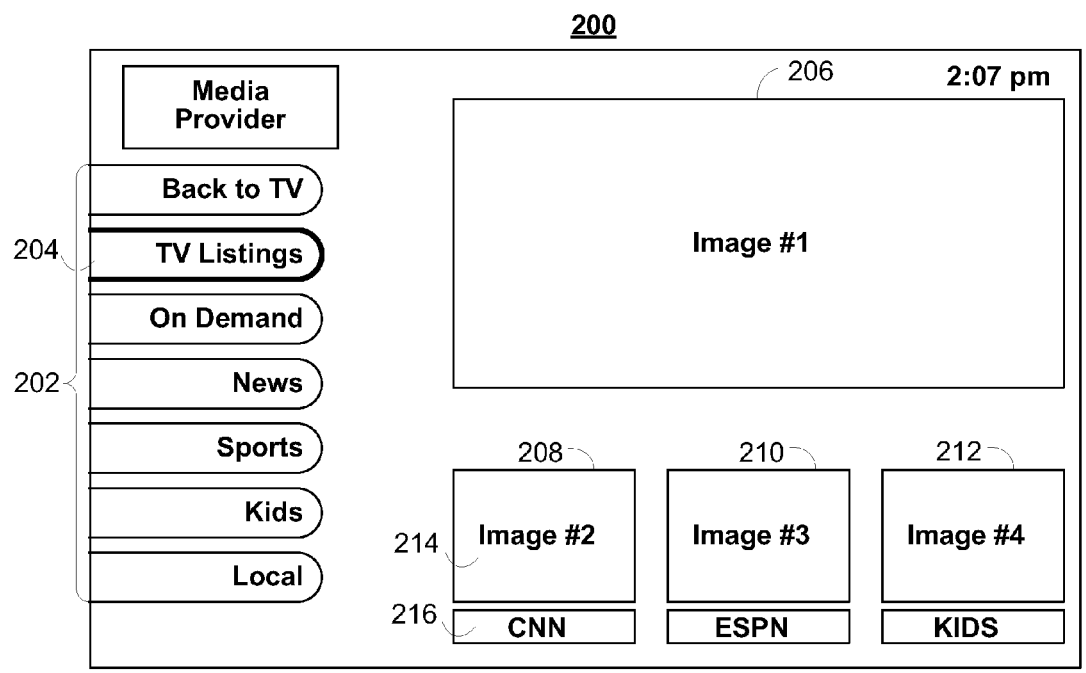

One of the functions of the media guidance application is to provide media listings and media information to users. FIGS. 1-2 show illustrative display screens that may be used to provide media guidance, and in particular media listings. The display screens shown in FIGS. 1-2 and 5-7 may be implemented on any suitable device or platform. While the displays of FIGS. 1-2 and 5-7 are illustrated as full screen displays, they may also be fully or partially overlaid over media content being displayed.

A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. Patent Application Publication No. 2003/0110499, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. patent application Ser. No. 09/437,304, filed Nov. 9, 1999, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
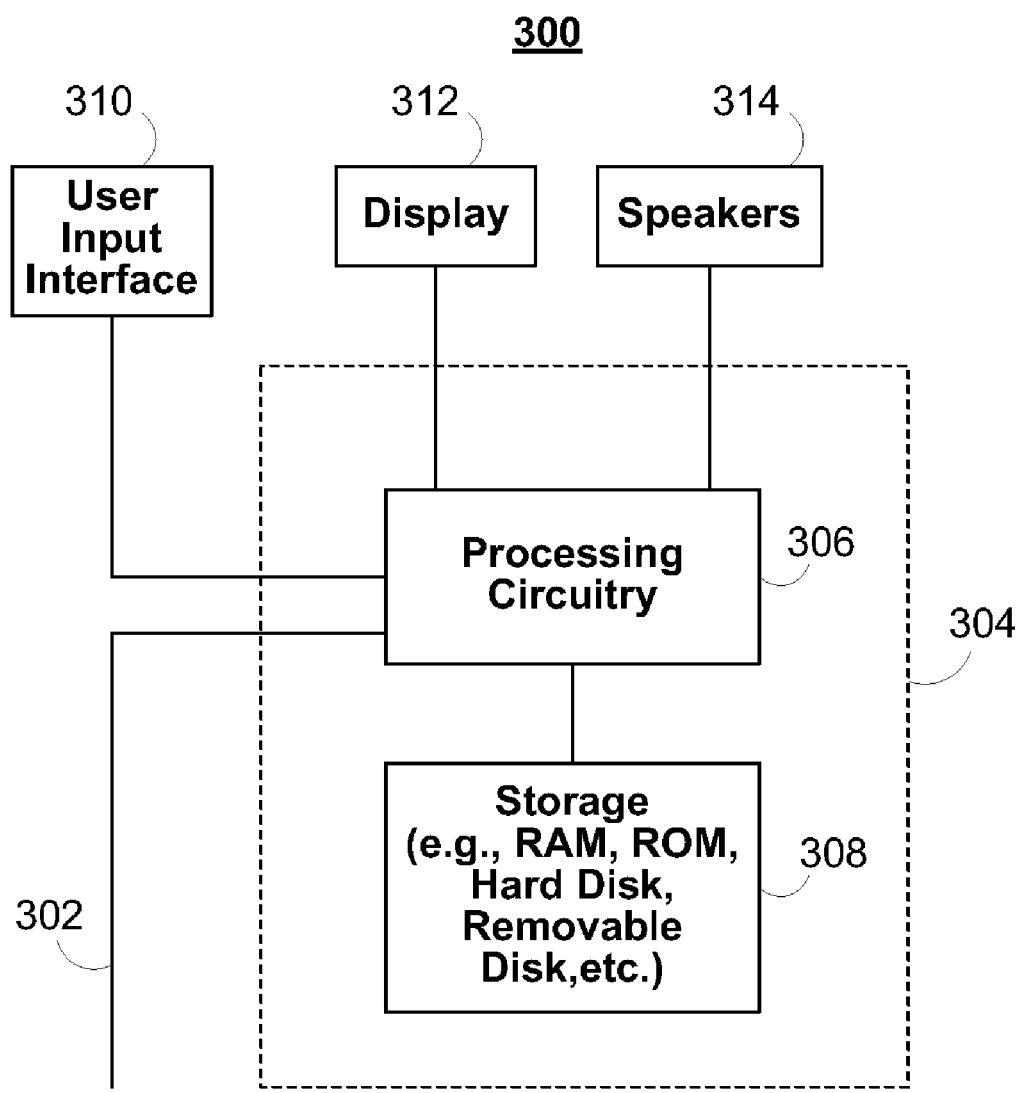
FIG. 3 shows an illustrative user equipment device in accordance with one embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for up-converting and down-converting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
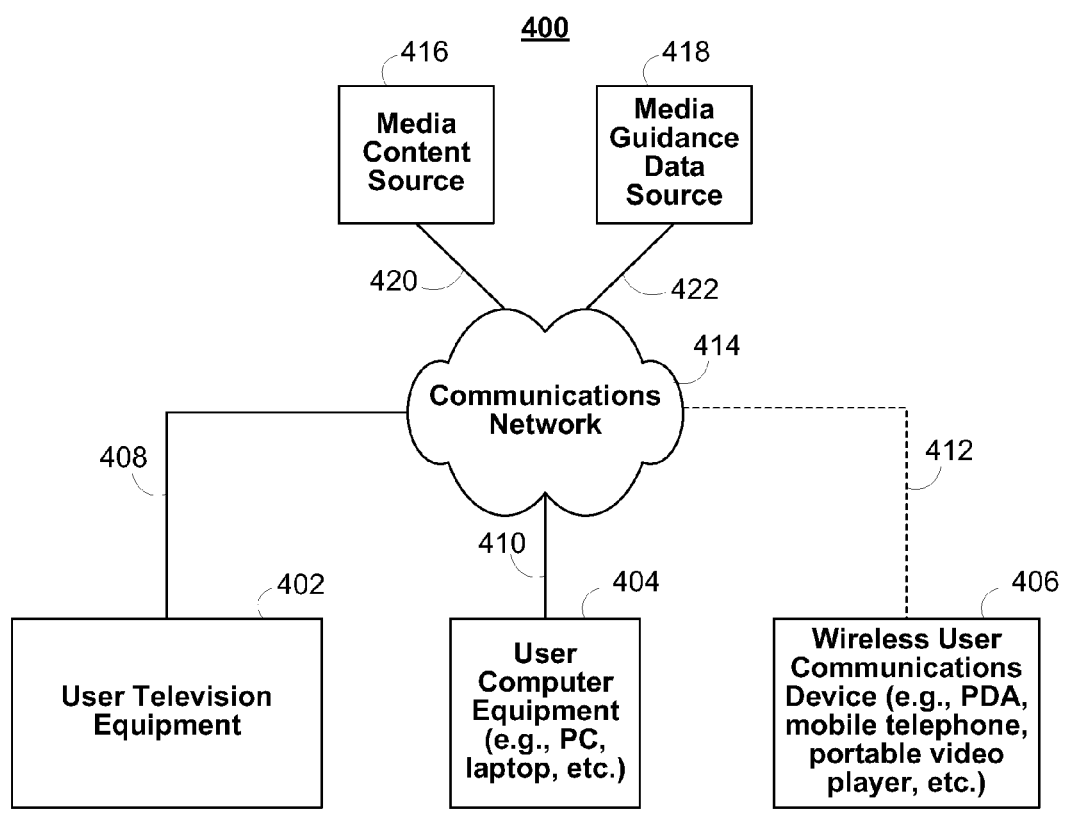
FIG. 4 is a simplified diagram of an illustrative interactive media system in accordance with one embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices.

For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

Figure 5:
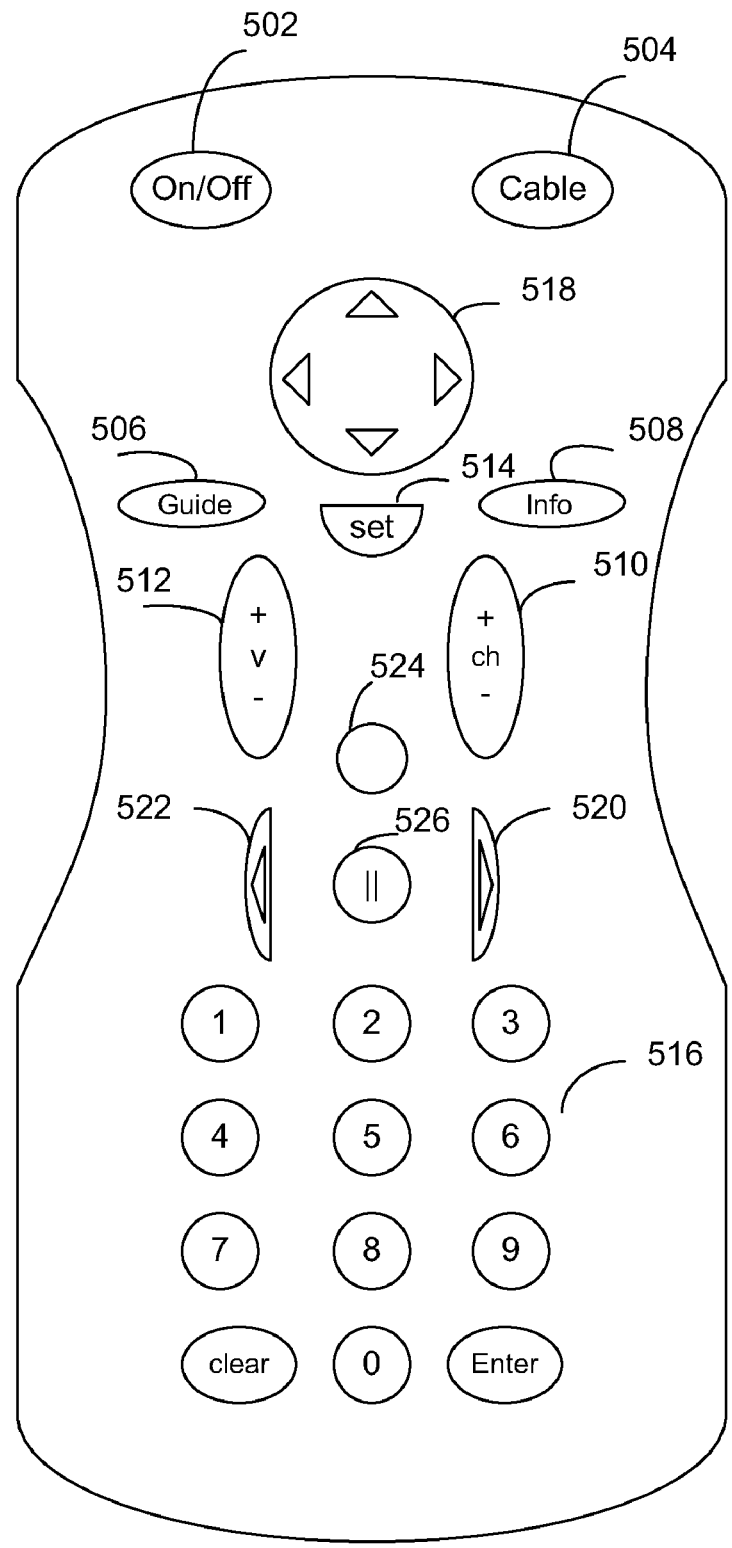
FIG. 5 shows a view of a conventional remote controller.

FIG. 5 shows a view of conventional remote controller 500. The remote controller 500 includes an on/off button 502, a cable button 504, a guide button 506, an info. button 508, a channel button 510, a volume button 512, a set button 514, a keypad 516, a navigation button 518, a fast-forward button 520, a rewind button 522, a floating button 524, a pause button 526, and an infrared communication interface (not shown).

In operation, a user may press the on/off button 502 to turn an electronic device on or off. If the conventional remote controller 500 is used to control a cable set-top box, the cable button 504 may be used to turn on/off the set-top box connected usually to a television system. Other buttons, such as the guide button 506 and the info. button 508, may allow a user to interact with a media guide according to the descriptions for FIGS. 1-4. A user may further increment or decrement a channel using the channel button 510. Similarly, a user may change the volume by interacting with the volume button 512.

The set button 514 may be used in various ways. In some situations, the set button 514 may allow a user to implement a highlighted program. In other situations, the set button 514 may allow a user to configure settings of an electronic device through interacting with a user interface application such as the media guidance application. The navigation button 518 allows a user to move a highlight region 110 on a user interface in two dimensions by moving the highlight region 110 up/down or left/right. The fast forward and rewind buttons 520 and 522, respectively, may allow a user to fast forward or rewind a recorded show, an on-demand show, or any media content.

The floating button 524 may be a button reserved for a user to program additional functionalities into the conventional remote controller 500. In some embodiments, the remote controller 500 may be configured to work cooperatively with another remote controller system, such as the remote controller system as illustrated in FIGS. 6, 8-11. Upon receiving a user pressing the floating button 524, the user may be allowed to access a look-up table of commands currently registered with the electronic device and the conventional remote controller 500. A user may be allowed to use buttons on the remote controller 500, such as the keypad 516, to input any user defined commands for programming the look-up table or any other aspects of the user interface application for controlling the electronic device. As an example, a user may wish to add a binary string that may correspond to either a user selected command that the electronic device may have configured to execute or, alternatively, a new command created by the user.

In some embodiments, in addition to having the remote controller 500, a user can also interact with an additional remote controller system such as the remote controller system 600 for controlling the same electronic device. Both the remote controller system 600 and the conventional remote controller may control the same operations associated with a device. Alternatively, the controller 500 and the system 600 may each contain additional functionalities not shared with each other. Accordingly, because a user can switch between the controller 500 and the system 600, the application may be configured to communicate with the controller 500 and/or the system 600.

Figure 6:
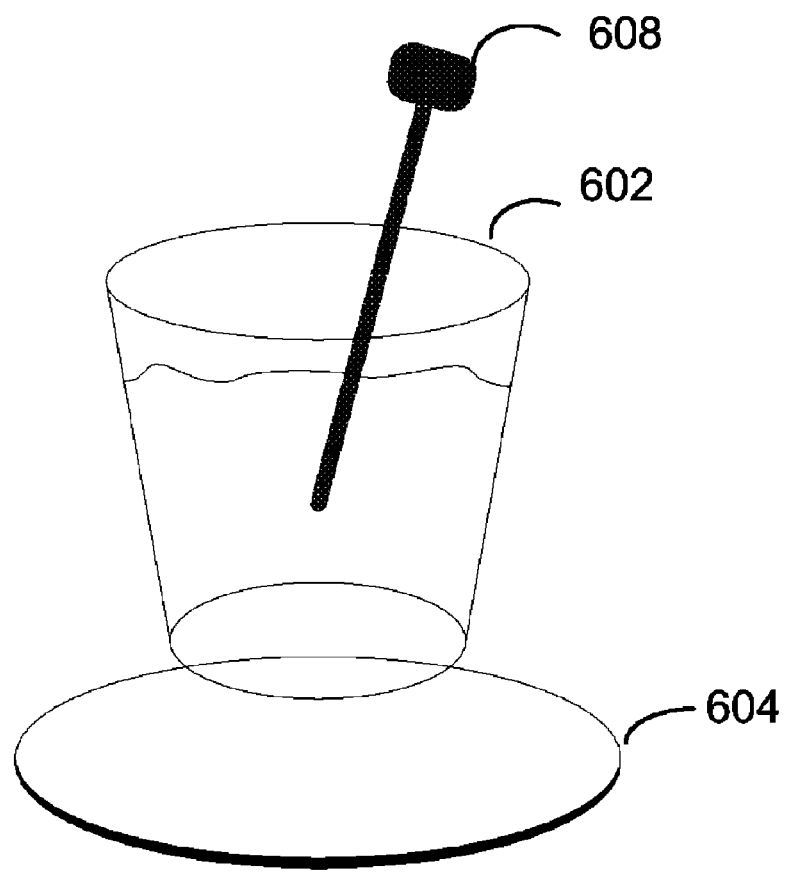
FIG. 6 shows an illustrative controller system according to one embodiment of the invention.

FIG. 6 shows an illustrative controller system 600 according to an embodiment of the invention. The controller system 600 includes a liquid container 602, a platform 604, and a stirring rod 608. The stirring rod 608 includes a magnet 722 and/or a magnet tip. The liquid container 602 can hold various liquids and may be made of various materials, such as glass, aluminum, wood, porcelain, etc. The platform 604 includes internal circuitry and sensors for detecting a condition of the container 602 and/or rod 608, or a user interaction with the controller system 600. The platform 604 may be made of and/or include various materials, such as, without limitations, glass, polymers, rubber, cloth, metal, and the like.

Functionally, the platform 604 supports the liquid container 602. The platform 604 may include a stirring rod 608 holder for holding the stirring rod 608 when not in use. The platform 604 may also support additional liquid containers and/or stirring rods (not shown).

In operation, a user may stir the liquid in the liquid container 602 to control one or more operations of an electronic device connected, through a communications interface, to the controller system 600. The controller 600 may sense, through one or more sensors, a user stirring the liquid in a clockwise direction and use the sensed interaction as a user input to control an operation of an electronic device. In one embodiment, the electronic device includes a set top box and/or television running a media guidance application.

Stirring a liquid in the liquid container 602 may correspond to various different kinds of commands, depending on the configuration. In some embodiments, a user can move the highlighted region 110 by stirring the stirring rod 608 clockwise. To access or select a program under the highlighted region 110, the user may tap the liquid container 602. The user may tap the container 602 using the rod 608, another item, and/or their finger. In some embodiments, the sound of tapping the liquid container 602 corresponds to a user selection action, like a 'click' using a computer mouse or click wheel. Similarly, a user may stir the stirring rod 608 counter-clockwise to fast forward through a program listing in time.

In other embodiments, a user can stir the liquid in the container 602 in a counter-clockwise direction to turn a television on. Similarly, the television may be turned off upon detecting that a user is stirring the liquid in a counterclockwise direction. Additionally, stirring the liquid in one direction multiple times may indicate a different user input and would, therefore, control the electronic device to implement a different function, such as to access a media guide or to access additional information of a television show.

A user may tap the stirring rod 608 or another item against various objects, such as the liquid container. Sounds generated from tapping may be used to control an operation of an electronic device. The tapping sounds may be sensed by an acoustic sensor 714 of the remote controller system 600. Characteristics of the sound that may be detected include: frequency, pitch, and/or dynamics such that tapping different objects (using different items) can be detected. Each distinct sound profile may control a different operation of an electronic device. In some embodiments, the acoustic sensor 714 of the platform 604 can detect the acoustical shockwaves generated by a user tapping the stirring rod 608 against the liquid container 602.

The controller 600 may be configured to differentiate among various acoustic waves or sounds. For example, when the liquid container 602 is filled with liquid, tapping the stirring rod 608 against the liquid container 602 may generate a sound profile different from sound generated by tapping the liquid container 602 when it is without any liquid. Therefore, each of the two sound profiles may correspond to a respective user input capable of controlling the electronic device to, for example, turn on the television when the liquid container 602 is full and turn the television off when the liquid container 602 is empty. Similarly, a user may mute a television by tapping the liquid container 602 twice, regardless of whether it is filled or empty. The same user interaction may also be programmed to pause the television system. It should be appreciated that a user can control a plurality of operations of an electronic device by interacting with the controller system 600 and its components in various ways without limitations.

The controller system 600 may further be configured to differentiate among various source profiles generated by and/ or received from multiple sources. For example, when a door bell rings, the user typically has to answer the door. Therefore, the remote controller 600 may anticipate a user going away from watching a television program to answer the door and would, therefore, automatically pause a show the user is watching. Alternatively, the remote controller system 600 may automatically mute the television, or perform any other operations depending the specific settings a user wishes to have on the remote controller system 600. Other sound sources that may generate sounds proceeding predictable user inputs may include: a telephone ring, a kitchen timer, a wake-up alarm, a fire alarm, a pager, etc.

The controller system 600 may be pre-configured with settings that may interpret a certain user interaction as a particular user input for controlling an operation of an electronic device. However, a user may also have the option to program the remote controller system 600 such that a certain user interactions will be used to control a specific operation as selected or programmed by the user. For example, while the default setting of the controller system 600 may be to pause a television show and/or on-demand program when sensing a user tapping the liquid container twice or a door bell ringing, the user may, instead, program the remote controller 600 to mute the television show audio instead.

In certain embodiments, the system 600 includes a memory and/or data store for storing interface control information. For example, the data store may include a database and/or list of user interactions with an item (e.g., the container) and/or detected conditions of an item (e.g., the amount of liquid in a cup). The database and/or list may associate each of the user interactions and/or item conditions or changes in an item's condition with one or more operations of an electronic device including, for example, an interactive media guidance application running on a set-top box. The data store may be integrated with the system 600, integrated with the electronic device, and/or located at a remote location. One such remote location may be a distribution facility of a media provider.

The user may be given the option to program the controller 600 to use the same user interactions for controlling different operations of multiple devices simultaneously. For example, tapping the stirring rod 608 against the liquid container 602 may select a media program while at the same time roll down a curtain to create a better viewing environment. Similarly, if a door bell is ringing, the remote controller system 600 may pause the television show and at the same time use the interaction to ignore an incoming call because the user is probably answering the door and will be unable to answer the phone. The remote controller system 600 may then, upon receiving the sound of a user shutting the door, automatically resume the program the user was watching. Evidently, all operations are executed without an explicit user input because the remote controller system 600 is anticipating predictable user behaviors that are indicative of user inputs for controlling one or more electronic devices. A user may pre-program the remote controller system 600 by recording other sound profiles not initiated by a user, such as the sound of a door bell, telephone ring tone, etc., so that each sound profile may correspond to a user selected command for controlling an operation of an electronic device.

Although the liquid container 602 may include containers such as a cup, a can, a glass, a mug, a wine glass, a plastic water bottle, and the like, the liquid container 602 may also include special or custom made container including sensors that may work separately from or in addition to sensors of the platform 604. For example, the liquid container 602 may contain one or more sensors to sense the amount of liquid contained in the liquid container. In some embodiments, the sensors of the liquid container 602 may send information about the amount of liquid contained in container 602 to a set-top box through either a wired connection or a wireless connection so that certain operations may be implemented automatically. For example, when the liquid container 602 is or close to being empty, the sensed data may be sent to a processor located underneath the platform 604 or remotely at a different device. The processor may then decide to pause the current program being watched because the user will shortly refill the liquid container 602 and, therefore, will not be watching the television program in the meantime.

The liquid container 602 may further contain sensors capable of identifying or estimating the content of the liquid. Upon a user's consent, such information may be sent to a user equipment system such as a television system so that commercials or advertisements related to the liquid being consumed will be present to the user. For example, if a user is currently watching super bowl and the liquid container 602 has detected that the liquid being consumed is beer, the television system may automatically present to the user commercials related to beer. Similarly, if the user is currently watching Iron Chef America and is consuming wine, the television system may present recommendations or commercials related to wine to a user.

In some embodiments, sensors for sensing the amount of liquids left in the beverage container may be embedded within the platform 604. The sensors can be any pressure sensors, weight sensors, heat sensors, and the like. The platform 604 may further include an array of sensors and/or sensor arrays mapped throughout the platform to track the movement of the liquid container 602 as controlled by a user. The platform 604 may further include a touch screen panel, sensors, and circuitry. If the platform 604 includes a touch screen, the touch screen may further allocate areas for icons that a user may interact with by moving the liquid container 602 to the top of an icon. The platform 604 may include a sensor for detecting a vertical movement of the liquid container 602. The container 602 and/or rod 608 may include a sensor, such as, for example, an accelerometer and/or thermometer. If a user decides to refill the liquid container 602, the platform 604 may detect the difference between a user picking up the liquid container 602 for consuming the liquid and picking up the liquid container 602 for refilling. Therefore, once a sensor has detected that the liquid container 602 has been lifted for either substantial amount of time or high in space that is unlikely to be the height of a user's mouth relative to the platform 604, the platform 604 may use the information to automatically pause a media program since a user is likely going to be away from watching the media program.

In operation, various methods may be employed for differentiating one user interaction, item manipulation, and/or item condition from another. For example, one implementation may only require the controller system 600 to include pressure sensors and/or a clock, counter, or other time sensors. In the situation where a user has gotten up to refill the liquid container 602, the amount of time away may be longer than the time it takes for a user to consume the liquid. Therefore, coupled with the pressure sensor data indicating that the liquid container 602 has been lifted from the platform 604, a processor may determine that the liquid container 602 has been taken up for a refill. Additionally, the pressure sensor may measure the weight difference during a measured time interval (e.g. pressure 1 at t1 and pressure 2 at t2). To ensure accuracy, both methods may be incorporated to determine whether a user is about to get a refill. In certain situations, other data, such as time of day, user's previous activity, and/or user preferences, may also be utilized and incorporated into the decision-making process. Therefore, the processor 710 of the controller system 600 may utilize one or more algorithms and/or predictive models to predict the appropriate control input for an electronic device based on prior user actions.

Figure 7:
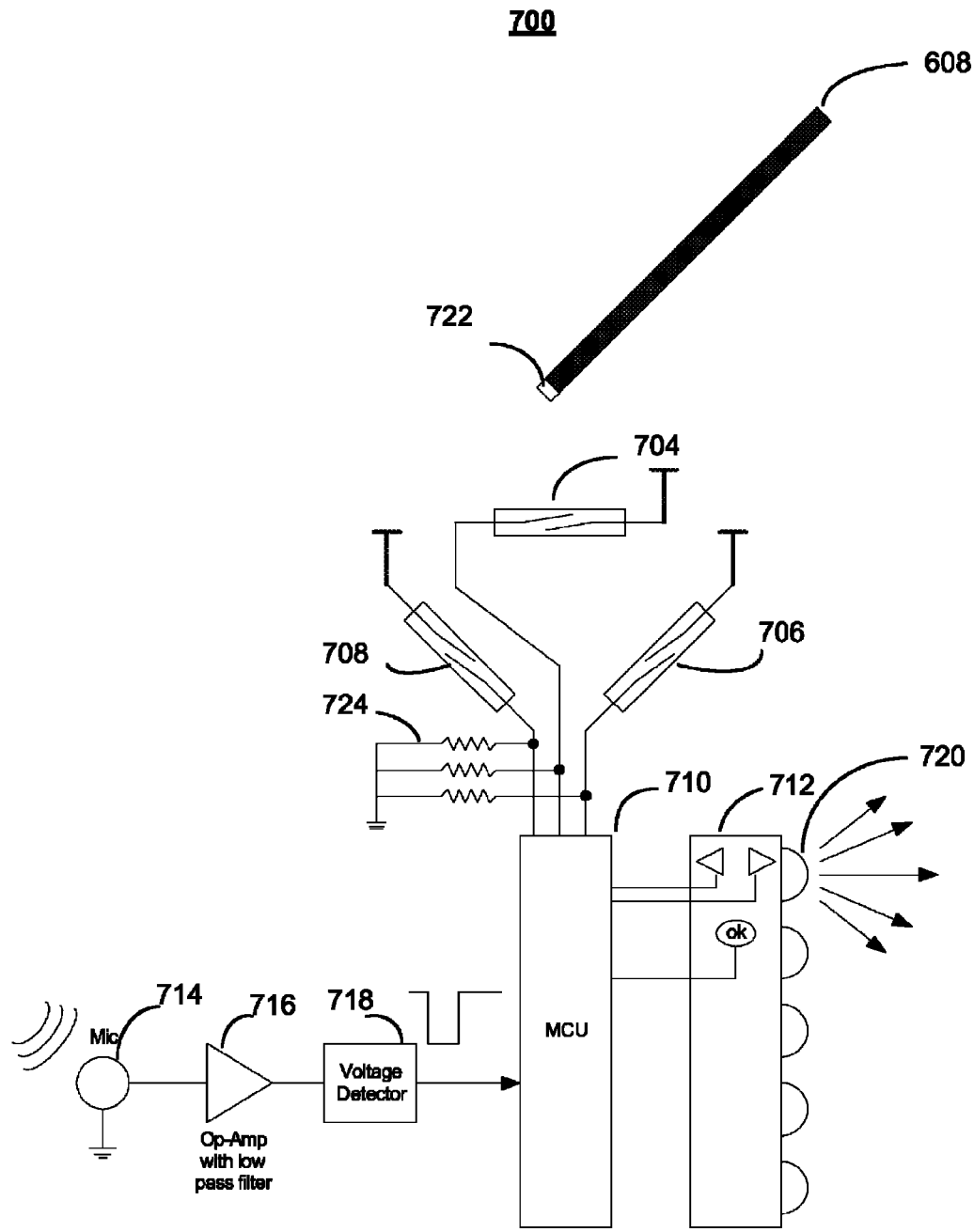
FIG. 7 is a circuit diagram of a controller system according to an illustrative embodiment of the invention.

FIG. 7 includes a circuit diagram 700 of the controller system 600 according to an illustrative embodiment of the invention. The circuit diagram 700 includes a stirring rod 608, proximity sensors 704, 706, and 708, a processor 710, a communications interface 712, an acoustic sensor 714, acoustic amplifier 716, voltage detector 718, shunt resistors 724, and a platform (not shown). A sensor 704-708 may include a reed relay, hall effect sensor/switch, pressure sensor, temperature sensor, magnetic sensor, optical sensor, RFID tag, and the like. The processor 710 may include a microprocessor, microcontroller, a state machine, or other controller circuitry.

In some embodiments, the processor 710 may include an Atmel AT89S52 microcontroller. The communications interface 712 may include a wireless interface 720 and may support the Digital Living Network Alliance, DLNA, standards, a wired standard, a wireless standard, and the like. The communications interface 712 may also include a wired interface (not shown). The wireless interface may support any one of a number of wireless protocols such as, without limitation, Infrared, Radio, Bluetooth, Wi-Fi, and the like. The wired interface may support any one of a number of network protocols such as, without limitation, USB, Serial, Ethernet, PCI, and the like. The platform 604, although not shown, may be of the type described with respect to FIGS. 6, 9-11. The stirring rod 608 may include a magnet 722 and/or magnetic tip or any one of the types of sensors mentioned above.

In operation, a user of an electronic device may employ controller system 600 as an interface to effect control of the operation of the electronic device. The system 600 may include a platform on which the user places a liquid container 602 holding a beverage that the user consumes. The user may use a stirring rod 608 to stir the liquid, e.g., coffee, in the container. The platform 604 may include one or more sensors such as, without limitation, sensors 704, 706, and 708. In one embodiment, the sensors 704, 706, and 708 include reed relays capable of sensing magnetic fields induced by the magnet 722 on the tip of the stirring rod 608. Using reed relays 704, 706, and 708, the relative position of the magnetic rod may be deduced. It should be noted that additional sensors such as the sensors 704-708 may be added to the controller system 600 to enhance its sensitivity and accuracy. Any portion of the system 600 may be integrated with a user equipment 802. For example, one or more sensors, the processor 712, or any other components may be integrated with the user equipment 802.

In one embodiment, in determining that a user is stirring the stirring rod 608 in a clockwise direction, sensor 704 will first sense the magnetic field induced by the magnet 722. Subsequently, sensors 706 and 708 will then sense the induced magnetic fields respectively in that order as the magnet 722 moves within vicinity of each sensor. The processor 710 may record the sequence of sensors that have detected the induced magnetic fields. The processor 710 may then determine that the detected sequence corresponds to a clockwise or counter-clockwise motion. In certain embodiments, the processor 710 accesses a look-up table stored in memory located either on board with the processor 710 or at a remote location accessible by the communications interface 712 to identify the command that corresponds to a clockwise and/or counter-clockwise motion. For example, stirring the stirring rod 608 clockwise may correspond to the command to scroll down on a media listing as seen on display 100. Such user interaction with the remote controller system 600 may be programmed by a user as a user input for controlling an electronic device to perform any number of functions or operations such as, without limitation, to pause an on-demand show, mute a television programming, move a cursor on a display up or down, increase/decrease volume, increment/decrement channels, fast forward a program listing in time, access additional information of a highlighted region 110, roll up an electrically controlled curtain, answer a call, disable a message box appearing on a media guide, request a flight attendant's attention, request a waitress' attention for refilling up a drink, and so on.

Similarly, a user may stir the stirring rod 608 counter-clockwise. Consequently, proximity sensor 708 may first detect the induced magnetic field from the magnet 722, follows by the proximity sensor 706 and 704 in that order as the magnet 722 moves within vicinity of each sensor. Alternate techniques for detecting the motion of the stirring rod 608 may be employed. For example, the rod 608 may include an accelerometer that detects motion and/or rotation. Those of ordinary skill may employ other known detection techniques to sense rotation and/or movement of the stirring rod 608 and/or fluid.

A clockwise motion may include the following proximity detection sequences: 706-708-704, 708-704-706, 704-706-708. Similarly, the following sequences may be used to indicate a counter-clockwise motion: 704-708-706, 708-706-704, 706-704-708. Thus, in certain embodiments a clockwise or counter-clockwise motion is detected by the processor 710 using relative positional movement to determine the direction of motion.

In some situations, a user may start at a position that is of equal distance to two of the three proximity sensors: 704, 706, and 708 and, therefore, both sensors may sense the induced magnetic field from the magnet 722. However, since the stirring rod 608 moves away from one of the two sensors while moving closer to the other, the processor 710 can resolve such an uncertainty by tracking the position or relative distances of the stirring rod 608 with respect to the two sensors. For example, if the stirring rod 608 starts in between sensor 704 and 708 and moves clockwise towards 706, the processor 710 may collect data points along the path the rod 608 has taken. The processor 710 may calculate that the stirring rod 608 has moved closer to 704 as opposed to 708, and if the sensor 706 subsequently detects the magnetic field, the processor 710 may resolve the uncertainty by determining that the rod 608 has started at a position closer to the sensor 704 and has moved from 704 to 706, which corresponds to a clockwise motion.

Other methods exist for resolving the position and/or motion of the stirring rod 608. For example, the processor 710 may receive signal strength and/or magnetic field strength data from the sensors 704, 706 and 708. If 704 and 708 both detect an equal amount of magnetic field induced by the magnet 722 because the rod 608 has started at a position in between the two sensors, as the stirring rod 608 moves away from one and toward the other, the difference in signal strengths as detected by sensor 704 and 708 will increase. In the situation in which a user stirs the stirring rod 608 in a clockwise direction, the signal strength of the signal detected by sensor 704 increases as the signal strength for sensor 708 decreases. Therefore, the processor 710 determines that the rod 608 has started at a position closer to 704 and uses this as a starting point to determine the rotation of the stirring rod. Other methods for resolving the movement of the stirring rod 608 as known by those of ordinary skill may be employed. To simplify the illustration, only three sensors are drawn in FIG. 7. Therefore, increasing the number of sensors may increase sensitivity and resolution of detection of the controller system 600.

The acoustic sensor 714 may be used to support additional functionalities that may accompany functionalities supported by the proximity sensors 704, 706, and 708. The acoustic sensor 714 may be any type of acoustic sensors capable of detecting acoustic signals, such as sounds, created by a user interacting with an object. In some embodiments, the acoustic sensor 714 include a microphone.

According to one embodiment, when a user taps the liquid container 602 with the stirring rod 608, sound waves propagate from the point of contact to the acoustic sensor 714 located either on top of, embedded within, or in the vicinity of the platform 604. Depending on the type of acoustic sensor and its capability, the acoustic sensor 714 may also be located remotely from the platform 604. The received acoustic signals may first be processed by various analog and/or digital circuits designed for signal processing before reaching the processor 710.

The acoustic sensor 714 may receive sounds other than a user tapping the liquid container 602 with the stirring rod 608. For example, a user may have to pause an on-demand program or recorded media program currently being watched in response to some other activity or event. That other activity or event may affect an condition of the item or environment surrounding the system 600. In one instance, the event may result as a sound or change in ambient sound conditions. For example, if a neighbor or friend is ringing a door bell, the system 700 via an acoustic sensor may sense the ringing sound of the bell and pause the play of a media program for a period of time while the user answers the door. The system 600 may pause the media program until a subsequent user interaction is detected to indicate that the user is ready for the media program to resume.

The acoustic sensor 714 may detect the acoustic waves sent by the ringing bell and pause a television program for the user automatically. Similarly, when a house phone or cell phone rings, the acoustic sensor 714 may detect such sounds and, again, pause an off-line program (e.g. on-demand, a recorded program, a DVD movie) that a user is watching. Alternatively, the controller system 600 may mute a television program the user is watching, whether it is a broadcast, recorded, or on-demand program. The second situation is especially useful in that users, before answering a call or while talking on the phone, often must first look for a remote controller and then, while being distracted by this process, find the mute button to mute the media program.

In certain embodiments, while a person is cooking and is receiving a call, the remote controller system 600 can automatically turn off the stove or lower the heat of a stove to avoid ruining a meal. In some other embodiments, for safety reasons or to avoid ruining a meal, an acoustic sensor may detect the oven timer alarm and, depending on the commands pre-programmed into the processor 710, the controller system 600 can automatically pause the media program the user is currently watching and/or lower the volume of the program to allow the user to more clearly hear the timer's alarm. Many scenarios or situations may exist in which a user may benefit from the controller system 600 that is capable of coordinating the operation of one electronic device in response to the operation of another device, system, and/or item, or the surrounding environmental conditions.

Acoustic signals associated with common door bells, timer alarms, telephone ring tones may be first pre-recorded and then stored in memory located either on board with the processor 710 or at a remote location accessible by the processor 710. Alternatively, the system 600 may be trained by sensing various conditions, e.g., a user's door bell, and storing the sensed sound associated with the particular item. A user may program the controller system 600 so that certain recorded sounds are associated with commands as defined by the user. The user may first record certain sounds by playing the sounds to the acoustic sensor 714 located on, within, or in proximity to the remote controller system 600.

In some embodiments, the remote controller system 600 is configured to allow a user to select from a list of commands for assigning certain commands to certain user interactions or sounds. In other embodiments, the controller system 600 or 700 is configured to allow a user to program customer or user-defined commands where the controlled electronic device supports user-defined command programming. The system 600 may support user-defined interactions and/or conditions that can be associated with control data and/or commands for controlling an electronic device.

Depending on the amount and/or kinds of functionalities a user desires, in some embodiments, the controller system 600 can contain only a certain type of sensor and limited types of sensors. For example, the system 600 or 700 may include the acoustic sensor 714 for sensing sounds. The system 600 may include the proximity sensors 704, 706, and 708, for sensing movement of an item. The system 600 may include other sensors for sensing other conditions. One or more of the types of sensors used for detection certain conditions may be used, at certain times, for controlling an electronic device.

Once the sensed acoustic signals are received by the acoustic sensor 714, the signals may be processed by a signal processing circuit. One component of analog signal processing may include an operational amplifier, such as the acoustic amplifier 716, to first amplify the received signals. Other filters, such as a low pass filter, may be included in the acoustic amplifier 716, to assist with filtering out any unwanted ambient noise signals. In some embodiments, the acoustic amplifier 716 may further include a band-pass filter capable of filtering out frequencies outside a pre-defined range of frequencies, as defined by a designer or adjusted by a user.

In certain embodiments, frequency ranges to be filtered are adjustable so that a user can customize the types of acoustic noise that the system should filter out to enhance the signal to noise ratio, SNR, of the received acoustic signals. For example, a user may wish to eliminate noises from the received acoustic signals to reduce interference. The system 600 may record sound profiles associated with noise to be filtered, which may include, for example, ambient noise or a barking noise from a dog, and then store the sound profile so that the system 600 may filter sounds of this profile from received audio signals. By recording sound profiles of common noises and eliminating these sound profiles from the received acoustic signals, the signal-to-noise ratio, SNR, of any acoustic signal may be increased. Accordingly, the accuracy of determining what each received acoustic signal may correspond to may also be increased.

After the received signals have been filtered by the acoustic amplifier 716, the voltage detector 718 may convert the acoustic signals into voltages. Various techniques may be employed for encoding the received acoustic signals. For example, the frequencies of an acoustic signal may correspond to discrete voltage levels. In other instances, the amplitudes of the acoustic signals may correspond to discrete voltages. In some embodiments, both frequency and amplitude information may be encoded together to correspond to discrete voltage levels. The voltage detector 718 may also include or be connected to an analog to digital converter, so that voltages corresponding to the frequencies and/or amplitudes of the acoustical signals may be encoded as binaries to be processed by the processor 710.

The processor 710 may contain a look-up table from which the processor 710 can determine which control command a sound profile may correspond to. For example, tapping an empty liquid container may mean that the user wants to pause an on-demand television and would like to refill a liquid container. However, if the liquid container contains a substantial amount of liquid, the tapping of the container may generate a different sound profile, SP1, than the sound profile of tapping an empty glass, SP2 and, therefore, the processor 710 may look up the commands that correspond to each of these sound profiles. For example, in the look-up table, SP1 may indicate a 'select' command. SP2, may indicate a 'pause' command as the tapping of an empty glass would probably mean that the user desires to get up to refill the liquid container 602 and would, therefore, be away from watching the media program.

The processor 710 may perform additional processing and, particularly, digital signal processing using various signal processing techniques, such as Fourier transform, Laplacian transform, Wavelet Transform, and/or any other time-domain and/or spatial domain dependent signal processing techniques.

The processor 710 may include any type of microprocessor or microcontroller. In certain embodiments, the processor includes an Atmel AT89S52, 8-bit microcontroller. In other embodiments, the processor 710 is an embedded processor in which the architecture and various other components were customized for the remote controller system 600. The processor 710 may also include a Field-Programmable-Gate-Array that a user may program functionalities that the user wishes to include in the remote controller system 600. The processor 710 may be located within the controller system 600. Alternatively, the processor 710 may be located at a remote location accessible through the communications interface 712. The controller system 600 may offload a portion of processing to a more powerful processor located remotely.

The processor 710 may receive sensor data from the proximity sensors 704-708 and/or the acoustic sensor 714, or some other sensor. Although the received sensor data may have been filtered and/or processed, the processor may contain additional signal processing components as described above for further processing the data into a desirable format. The processor 710 may be built on the same board as the communications interface and may communicate with the communications interface 712 through on-board buses. Alternatively, the communications interface 712 may be located on a separate chip and/or board from the processor 710 and may communicate with the processor 710 using any of existing known serial and/or parallel communication protocols. Once the processor 710 receives signals sensed by the sensors, the processor 710 may then retrieve the corresponding command from a look-up table. In some embodiments, to maintain data integrity, such as to avoid interference or degradation of signal in transport, the processor 710 may include error bits, such as parity bits, in the binary code of a user input command. Other known encryption techniques may be employed. The processor 710 will then send the encoded data to the communications interface 712.

The communications interface 712 handles communications between the processor 710 and/or any other electronic devices. The communications interface may receive from the processor 710 encoded binary data representative of commands to be executed. In some embodiments, the communications interface 712 includes the wireless interface 720. If the wireless communications protocol for the wireless interface 720 is infrared, the wireless interface 720 may include light emitting diodes, LEDs, that may transmit infrared signals to a receiver located remotely at an electronic device. The LEDs may send out a series of light pulses corresponding to the appropriate binary codes sent by the processor 712.

For example, a binary code corresponding to pausing a television may be 001 0001. The infrared, or any other wireless communication schemes, may use space coding in which the length of spaces between pulses of infrared light may represent a one or a zero. The illustrative code above includes a 4-bits command following the 3-bits address. Upon receiving the 7 bits code, the receiver may first verify that it is the intended recipient by matching the device address with the binary 001 of the received binary string. The receiver may then interpret the command code following the address code by accessing a look-up table containing commands and their corresponding binary codes. The 4-digit command code may then be sent to a processor located at the electronic device on which the command will be implemented. In the illustrative embodiment, 0001 corresponds to pausing a television program. The processor of the electronic device, such as a cable set-top box, may pause the television program currently being provided by the set-top box.

In some embodiments, the communications interface 712 include a wired interface that connects the remote controller 600 to a computer. The connection may be implemented using a USB cable. A user may use the computer to download new command codes to and/or modify any existing command codes of the processor 710 in the remote controller system 600. The computer may contain software tools that may help a user to program the remote controller 600.

Figure 8:
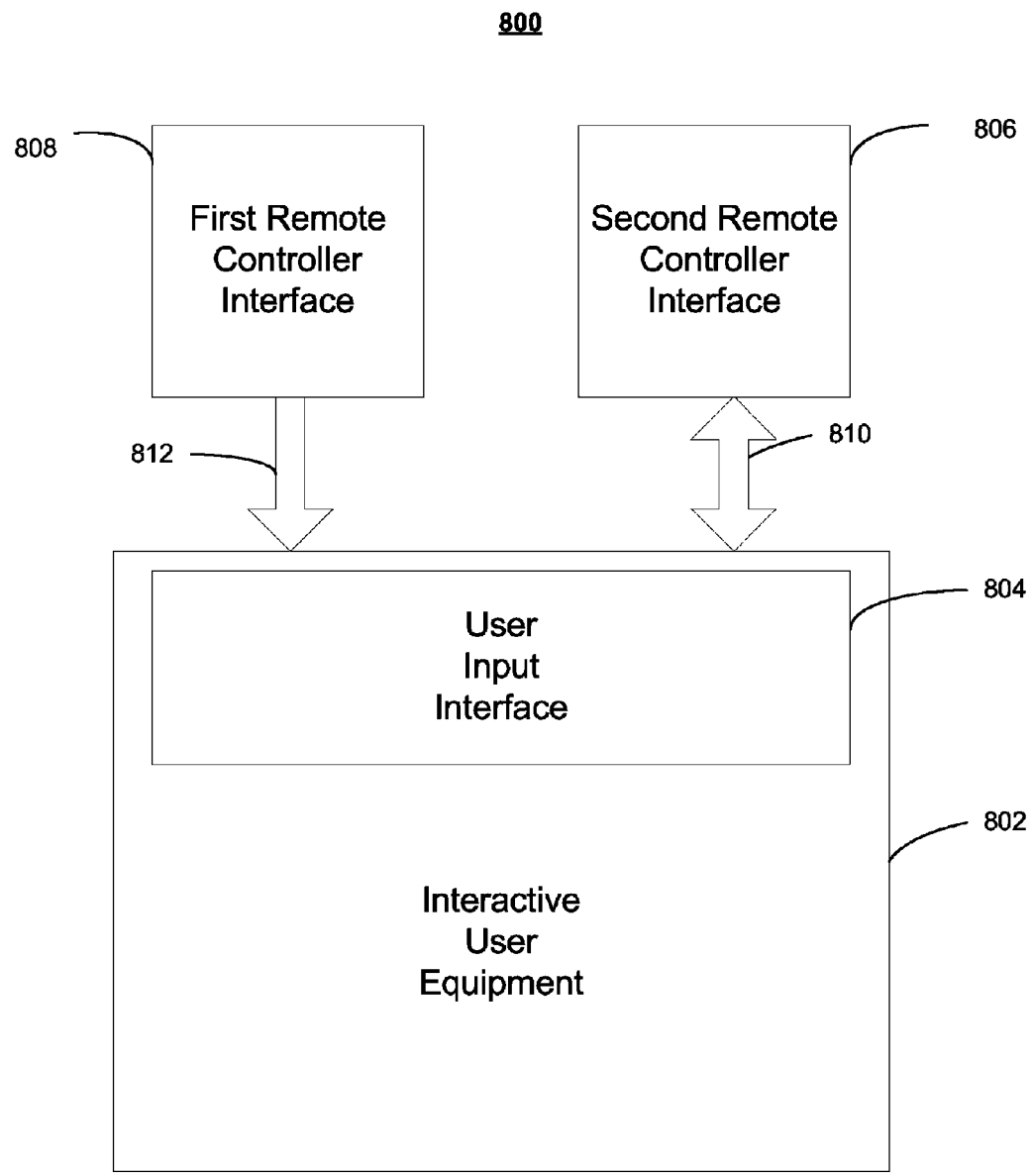
FIG. 8 is a functional block diagram illustrating one or more remote controllers in communications with an interactive user equipment according to one embodiment of the invention.

FIG. 8 is a functional block diagram 800 illustrating one or more remote controllers 806 and 808 in communications with an interactive user equipment 802 according to one embodiment of the invention. The functional block diagram 800 includes an interactive user equipment 802, a first remote controller interface 806, a second remote controller interface 808, a first communications channel 810, and a second communications channel 812. The interactive user equipment 802 also includes a user input interface 310. The first remote controller interface 806 may correspond to the communications interface 712 of the remote controller system 600. The second remote controller interface 808 may be the communication interface of the conventional remote controller 500. The communications channels 810 and 812 may support any of the above-mentioned communications protocols, such as, infrared, wi-fi, and radio for wireless protocols and USB, PCI, Serial, Ethernet, and the like for wired protocols.

The interactive user equipment 802 may be controlled by the first and second remote controller interfaces 806 and 808 of the controller 500 and the controller system 600, respectively. However, at any moment in time, only one user input or both inputs may be received from the two remote controller interface 806 and 808.

In some embodiments, the first remote controller interface 806 includes a different software application and/or support a different communications protocol than the second remote controller interface 808. The user input interface 310 may be configured to communicate with both interfaces. For example, the first remote controller interface 806 may be part of the remote controller system 600 and contain a list of input commands, such as automatically recording a television program, that are not currently available on the second remote controller system 808, such as the conventional remote controller 500. The user interface 310 may be configured to execute commands received from either interfaces 806 or 808 regardless whether the controller 500 and the controller system 600 support the same functionalities.

The first and second remote controller interfaces 806 and 808 may utilize different communications protocols when communicating with the user input interface 310. For example, the second remote controller interface 808 may communicate with the user input interface 310 using an infrared wireless protocol while the remote controller interface 806 may use Bluetooth for communicating with the user input interface 310. The user input interface 310 may then contain applications, drivers, and hardware receivers for working with both types of communications protocols.

The system 600 and/or controller 500 may be configured to allow a user to enable/disable certain commands such that one of the system 600 and controller 500 is able to initiate particular control operations. In some embodiments, a portion of commands may be initiated by both the system 600 and controller 500 independently.

If a particular electronic device or user equipment 802 requires particular command codes, the system 600 and controller 500 may cooperate to ensure that either system is configured with the necessary command codes. For example, a user may have the option to transfer certain controls and/or command codes between the conventional remote controller 500 and the controller system 600 through the first and second remote controller interfaces 806 and 808. To support transferring commands from one to the other, the communications channel 810 may be a bi-directional communication channel to enable the remote controller 600 to receive the command codes from the conventional remote controller 500. In some embodiments, the controller system 600 may retrieve command codes from the conventional remote controller 500 by communicating directly with the communications interface, such as the second remote controller interface of the conventional remote controller system 500.

In other embodiments, since the conventional remote controller 500 has the same look-up table containing the same command codes as what is stored on the interactive user equipment 802, the first remote controller interface 806 can communicate directly with the user input interface 310 and retrieve the command codes from the interactive user equipment 802 to the remote controller system 600. This way, a user no longer has to program a new remote controller system 600 to include all the functionalities and features of the conventional remote controller 500. However, this does not mean that the remote controller system 600 is confined to the same list of command codes as that of the conventional remote controller 500. In fact, as described above, a user may have the options to program or customize the functionalities of the remote controller system 600.

The user interface 804 may prompt a user to indicate which one of the controller 500 and controller system 600 the user wishes to use to control the user equipment 802. Both remote controller interfaces may be used to control the same device. Both controller may be configured to control the same portion of operations. Each controller 500 and 600 may be configured to control a different portion of user equipment 802 operations. If the user equipment 802 includes multiple devices, the interface 804 may support configuration of controller 500 and/or 600 to control certain operations of each of the multiple devices.

Figure 9:
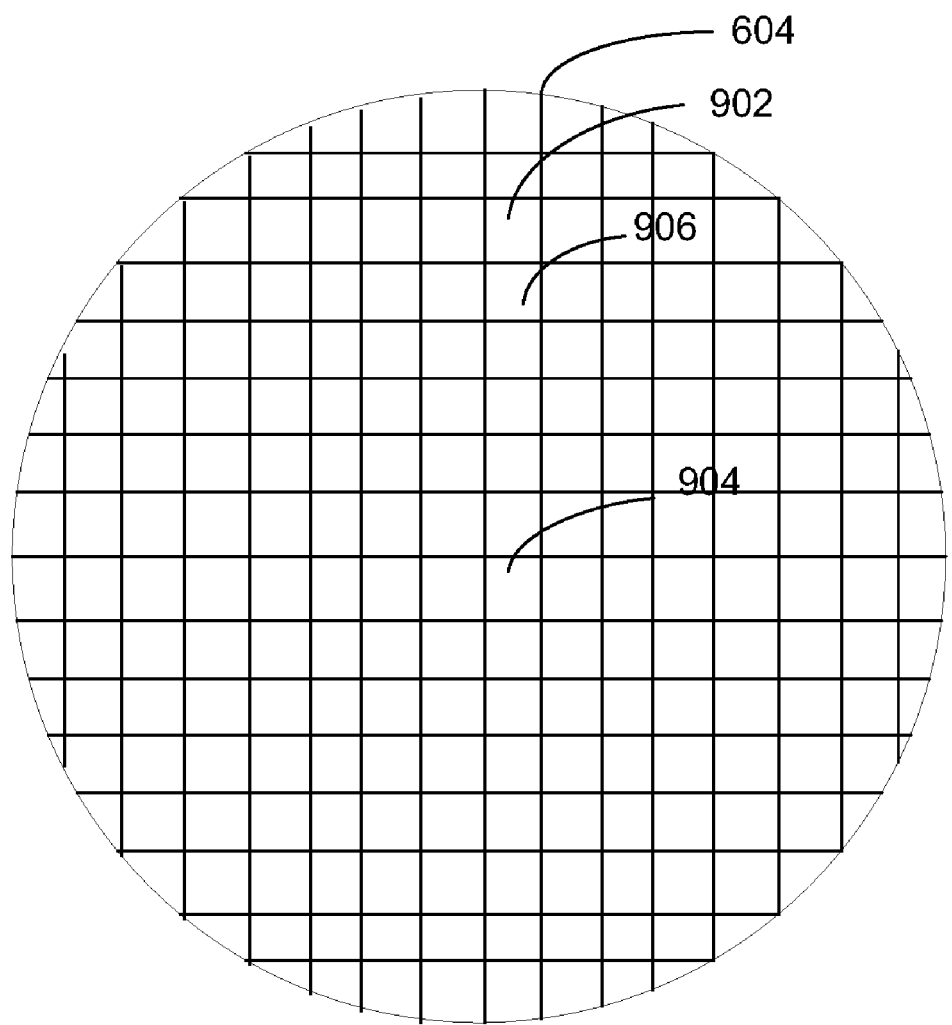
FIG. 9 shows a top down view of the surface of a controller system in accordance with an embodiment of the invention.

FIG. 9 shows an illustrative top down view of the surface of a controller system 900 in accordance with an embodiment of the invention. The controller system 900 includes a platform 604, and sensors 902, 904, and 906. The platform 604 may house a sensor array made from sensors such as the sensors 902, 904 and 906. The sensors 902, 904, and 906 may correspond to sensors 704, 706, and 708 of the remote controller system 600. The sensors 902, 904, and 906 may include any types of sensors such as, without limitations, reed relays, hall-effect sensors/switches, pressure sensors, weight sensors, heat sensors, magnetic sensors, optic sensors, etc. The platform 604 may further include other circuitry components (not shown), such as the circuitry illustrated in FIG. 7. The sensors may be distributed evenly throughout the platform 604. Depending on the need, the platform 604 may also support sensors of different kinds and distribute the different sensors on different parts of the platform 604.

In operation, sensors 902, 904, and 906 may include pressure and/or weight sensors used to detect the amount of pressure exerted on the surface of the platform 604. Using the pressure data, the remote controller detector 900 may determine a user input corresponding to a user interaction with the sensor. For example, sensors 902, 904, and 906 may be used to detect the pressure that the liquid container 602 exerts on the surface of the platform 604. As described earlier, remote controller system 900 may continuously measure the amount of pressure exerted on the platform 604 while a user is consuming the liquid in the liquid container 602. When the liquid container 602 is first placed on the platform 604 of the remote controller system 900, a pressure sensor may detect this pressure and use this as the initial condition. The sensors 902, 904, and 906 may send the initial condition or other pressure data to a memory preferably embedded within the remote controller system 900 and under the surface of the platform 604.

The pressure sensors 902, 904, and 906 may continuously measure pressure exerted by an object, such as the liquid container, resting on the top surface of the liquid remote controller system 900. At some time, the liquid remote controller system 900 may detect a substantial change in pressure (e.g. the pressure has decreased to a level substantially below the initial condition). Consequently, the liquid remote controller may control one or more operations of the electronic device using the change in pressure. For example, when the pressure has decreased substantially after some time, t, the remote controller system 900 may anticipate the user getting up to refill the liquid container 602. Accordingly, the remote controller system 600 may automatically execute a command in response to a substantial change in pressure that may indicate an empty container.

The pressure change may also be used to control other operations of an electronic device such as, without limitations, to turn off a TV, to turn on a TV, to begin recording a show because the user is not watching and the tuner can now be tuned to record a show, heat up an oven, begin heating/microwaving a beverage the user was drinking (e.g. more hot water for tea), play an audio commercial as the user may still hear the sound, not play a video commercial if the advertiser would like to only play the commercial when the user is watching the television, remind users of calls missed when watching the program, mute the television and/or brightness of the display to conserve energy, roll up the curtain, light up the lights in the kitchen, etc.

One or more of the operations may also be executed sequentially. For example, when a user gets up to refill the liquid container 602, the remote controller system 900 may first pause the television program, such as an on-demand show or a recorded program, and immediately record a show to a DVR or TiVo in the background for the user.

Other methods for predicting a user behavior, such as to refill a liquid container 604, may include detecting a close to zero pressure exerted on the remote controller system 900, because when a user lifts up the liquid container 604, no pressure would be exerted on the liquid remote controller 900.

To differentiate between a user lifting up the liquid container 604 for a refill with a user consuming the liquid, the remote controller system 900 may track the amount of time that the user has used while the liquid container 604 was not in contact with the remote controller system 600. For example, lifting up the container 604 for consuming the liquid contained within would require less time than for going to the kitchen for a refill.

To improve on the accuracy of the remote controller system 900, the system 900 may initially request a user to indicate to the system 900 whether the previous user behavior was for consuming the liquid or for refilling the container 604. That way, the system may more reliably interpret a user behavior and accurately execute the appropriate user command. Other sensors may exist to assist the remote controller system 900 in making certain decisions. For example, an optical sensor facing to the side of the remote controller system 900 (not shown) may be included to detect whether a user next to the optical sensor is getting up to leave the seat or is sitting still. Presumably, a user may sit at the same seat when consuming the liquid. The optical sensor may send light pulses to a user and detect light reflected from or absorbed by the user. Similarly, the sensor may include an acoustic wave sensor similar to that of an ultrasound transducer that may propagate sound waves to the user and detect waves reflected from or absorbed by the user. Both methods utilize the fact that when a user is not present, very little light and/or sound waves may be reflected or absorbed as opposed to when a user is present. These techniques may also be used to detect the presence or absence of an item, such a cup on the platform 604.

The planar sensor array formed by sensors such as the sensors 902, 904, and 906 may enable the remote controller system 900 to track a user moving an object resting on top of the system 900. The sensor array may include a two dimensional array where each sensor, such as the sensor 902, is mapped to a specific location of the platform 604. Each location may correspond to an x-y coordinate on the surface of the platform 604. The system 900 may identify the position of an object on top of the system 900 at any moment in time by detecting the pressure experienced by one or more sensors 902-906 of the array of sensors. Other types of contact, optical, friction, and/or surface sensor may be employed as an alternative or to complement the pressure sensors. For example, if a user is moving an object from where sensor 904 is located to where the sensor 902 is located, the remote controller system 900 may encode this sensed data as a user input for moving a highlighted region 2010 up on the display 100.

In other embodiments, by moving an object, such as the liquid container 602, towards the upper edge of the platform 604 can enable the controller system 900 to interpret this interaction as moving the highlight region 110 up, even though no explicit navigational regions or buttons are present. Similarly, by moving the liquid container 602 towards the left side of the platform 605, a user may move the highlighted region 110 to a cell left of where the region was on previously. Various embodiments and functionalities may exist to allow a user to interact with a media guidance application and/or any other applications for controlling electronic devices without explicit buttons and/or regions appearing on the platform 604.

Figure 10:
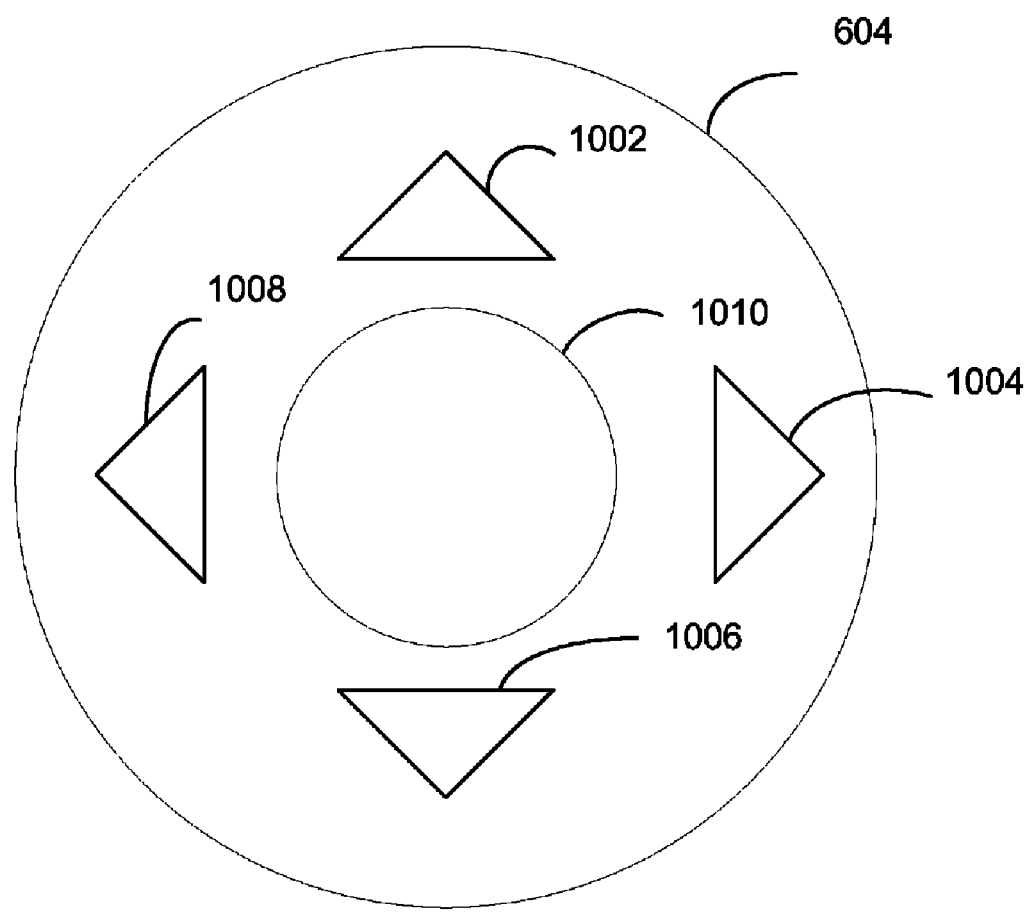
FIG. 10 shows an illustrative controller system according to an embodiment of the invention.

FIG. 10 shows an illustrative controller system 1000 according to an embodiment of the invention. The remote controller system 1000 includes the platform 604, a main menu region 1010, and navigational regions. The navigational regions include the up region 1002, the right region 1004, the down region 1006, and the left region 1008. The main menu region 1010 may correspond to a main menu button. Similarly, the up, right, down, and left regions 1002-1008 may correspond to an up, right, down, and left button respectively. Each button may include a sensor, a switch, or any controlling mechanism or user interface element that may allow a user to trigger an event or to control some aspects of a machine or a process. The remote controller system 1000 may also include a communications interface (not shown), which may allow the system 1000 to communicate with an electronic device using any of the above-mentioned communication channels. The system 1000 may also include additional regions (not shown). By moving an object, such as the liquid container 602 over on top of the various regions or 'buttons', a user can control one or more operations of a media guidance application or an electronic device.

In some embodiments, the remote controller system 1000 consists of a planar sensor array as described with respect to FIG. 9. The two dimensional sensor array may include sensors mapped throughout the entire remote controller system 1000. The sensor array may include sensors 704, 706, 708, 902, 904 and 906. These sensors may detect an object resting upon the platform 604. Alternatively, the system 1000 may include only sensors below the regions so that only sensors beneath a region over which a user has placed an object may be activated. The system 1000 does not necessarily have to include the actual outlines of the regions as illustrated in the figure and may be able to detect the various navigational and/or functional inputs by sensing that a user is moving the liquid container 602 up from the center or left from the center, etc.

A user's interactions with the remote controller system 1000 may be detected by the various sensors underneath the surface of and/or in contact with the surface of the platform 604. For example, a user may interact with various regions of the remote controller 1000 by moving a liquid container 602 across the surface of the platform 604. While watching a television program, a user may 'push' the main menu 'button' by moving the liquid container 602 on top of the main menu region 1010. In some embodiments, in response to detecting the liquid container as currently on top, the one or more sensors underneath the main menu region 1010 are activated. Alternatively, a switch, such as a reed relay 704, may be closed. The activated sensor or closed switch may be detected by the processor 710 which then generates a command code corresponding to the 'button' for the main menu region 1010. The interactive user equipment 802 may execute the command code (e.g. 001 0001) and prompt a user to a main menu interface on the display 100.

Once the main menu button gets 'pushed', a user may interact with a user interface application, such as a media guidance application, by the use of the navigational buttons and/or input mechanisms such as tapping the remote controller system 1100 with an object. A user may move the highlight region 110 up and down by moving the liquid container 602 to the up and down regions 1002 and 1006. To navigate a cursor on a display, a user may simply move the liquid container 602 to the corresponding regions for up/down/left/right. In some embodiments a user may have to tap the up/down region 1002 and 1006 to increase/decrease a volume. In other embodiments, a user may first select a 'change volume' option on the display 100 and then increase/decrease the volume by moving an object to the up or down regions 1002 and 1006. Similarly, a user may scroll media listings ordered based on time by moving an object over on top of the left and right regions 1008 and 1004.

Other user interactions may also exist to better assist a person in navigating a media guidance application and/or controlling an electronic device through the user input interface 310. For example, a user may tap the main menu region 1010 for accessing the main menu screen, which may either correspond to a program guidance menu or some other user interface depending on the device accessed and the interface associated with the device. Moving the liquid container 602 over to the main menu region 1010 may correspond to a different user input than tapping the main menu region 1010 once. Similarly, tapping the up region 1002 twice may allow a user to fast scroll a media listing or any other listings. Tapping the right region 1004 twice may fast forward the air time to allow a user to quickly check what show may be aired on a channel at a much later time.

Each region may correspond to a different command depending on which screen a user is currently viewing. For example, once a user is already in the main menu screen, moving an object over on top of the main menu region 1010 may allow a user to 'select' a highlighted program. Before in the main menu screen, a user may have to tap as opposed to just move the container 602 over on top of the main menu 'button' once to 'select'.

Other features described with respect to previous embodiments may also be employed in the remote controller system 1000 and vice versa. For example, the two dimensional sensor array may detect the amount of liquid in the liquid container 604. Accordingly, the sensors of the system 1000 may use the detected pressure and/or weight information or any other sensed data to perform operations on an electronic device automatically. For example, a media program may be paused or a recording may start automatically based on the amount of a liquid remaining in the liquid container 604. In addition to interacting with the remote controller system 1000 by moving an object across the surface of the platform 604, the remote controller system 1000 may include a stirring rod 608 that a user may use to tap the various regions of the remote controller system 1000 or to tap the liquid container 602. Other features and functionalities associated with a user interacting with a stirring rod 608 as described with respect to FIGS. 6 and 7 may be included in the remote controller system 1000.

Figure 11:
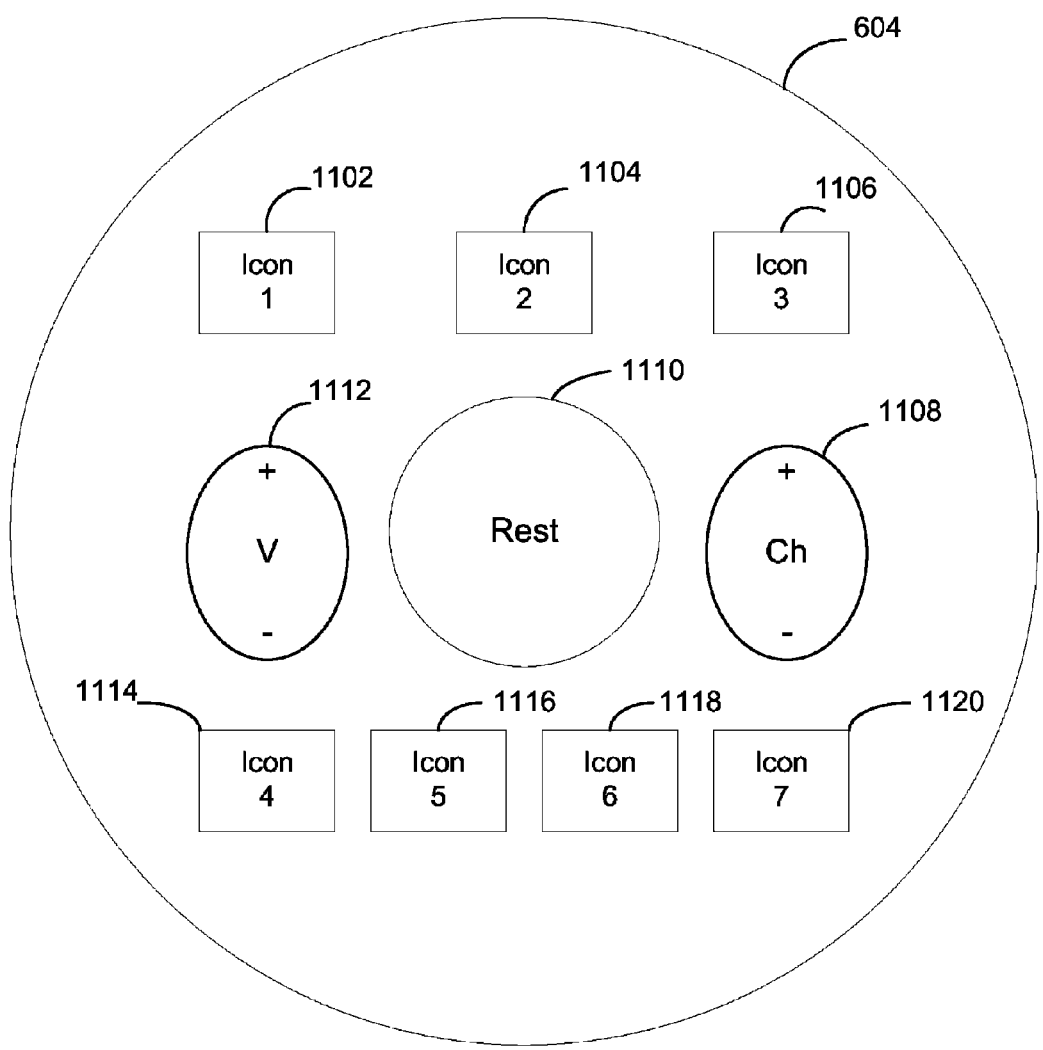
FIG. 11 shows an illustrative controller system according to an embodiment of the invention.

FIG. 11 shows an illustrative controller system 1100 according to an embodiment of the invention. The controller system 1100 includes a platform 604, an icon 1 region 1102, an icon 2 region 1104, an icon 3 region 1106, an icon 4 region 1114, an icon 5 region 1116, an icon 6 region 1118, an icon 7 region 1120, a channel region 1108, a rest region 1110, and a volume region 1112. Sensors of the types described throughout the application may be implemented underneath the platform 604 for detecting a user moving an object over on top of any one of the regions. Each region may then correspond to one or more sensors placed underneath the region below the surface of the platform 604.

In some embodiments, the remote controller system is on top of or built into a table so that each icon can support a standard size of liquid container. In other embodiments, the remote controller system 1100 may be smaller if a user were to interact with a small object that requires less surface space.

A user may interact with or control an electronic device through the remote controller 1100 by moving an object, such as a beer can, a coffee mug, a glass of wine, over on top of one of the regions. Each icon regions, such as an icon 1 region 1102 and icon 2 region 1104, may correspond to a different user interface area of the display 100. A user may move the liquid container 602 to any one of the regions to access information provided by a media guidance application and/or another user interface application of an electronic device.

In some embodiments, the rest region 1110 may correspond to the on/off button 502 of a conventional remote controller system 500. In some embodiments, tapping the liquid container 602 against the top of the rest region 1110 can turn on an electronic device and tapping the container 602 twice can turn off the electronic device. Similarly, a user may move the liquid container 602 over on top of icon 1 region 1102, which may correspond to the guide button 506. Alternatively, a user may tap the liquid container 602 against the top of icon 1 region 1102 to access a media guide and display the guide on the display 100. If a user wishes to access additional information associated with a television program, the user may move the liquid container 602 over on top of the icon 2 region 1104. Other icons may correspond to similar functions of the conventional remote controller 500 as described with respect to FIG. 5, or may correspond to features and/or functionalities unique to the remote controller systems 600, 900, 1000 and 1110.

A two dimensional array may be implemented in the remote controller system 100 for detecting any movement changes to an object placed on top of the surface of the platform 604. Such sensors may include, without limitations, reed relays or hall effect sensors if the liquid container contains a magnet, pressure and acoustic sensors as described above, heat sensors as the point of contact between an object and the surface of the platform 604 may create heat, optic sensors for measuring light absorbed or reflected off an object, and acoustic wave or ultrasonic transducer for measuring amount of sound waves reflected or absorbed by an object, etc.

Alternatively, sensors may exist beneath the various regions so that once a user has moved to a region under which there exists one or more sensors, the sensors may be activated and may deliver the sensed data to a processor either preferably located within the remote controller system 1100 or located at remote location accessible through a communications interface.

Other icons may correspond to various other functionalities or features available to a user for accessing information or content of a media guidance application or for controlling an electronic device. In fact, the same remote controller system 1100 may be used to control multiple devices such as an interactive user equipment 802 and devices connected to it, a curtain, a telephone, a stove, a microwave, etc. Certain regions, such as Icon 4 region 1114 may be reserved for controlling a curtain in the living room. Other regions, such as Icon 5 1116 may allow a user to access recorded programs stored on a DVR or TiVo. Icon 6 region 1118 may bring up a keypad as shown in FIG. 5 of the conventional remote controller system to allow a user to enter a channel number.

In fact, the remote controller system 1100 may contain all the functions and/or commands of a conventional remote controller system. Similarly, a user may increment/decrement a channel by moving to the corresponding up or down regions of the channel region 1108. A user may also change the volume of a device by moving an object 602 over on top of the volume change region 1112. Additional regions may be added, or alternatively, a user can program the remote controller to perform specific operations.

The remote controller system 1100 may also be configured to detect user interactions with the liquid container 604 for anticipating predicted user behaviors that may occur after a detected user interaction. As described with respect to FIGS. 6 and 7, the remote controller 1100 may automatically pause an on-demand show if the system 1110 detects that very little amount of liquid is left in the container 602 and, therefore, the user may soon be going away from watching the program to refill the container 602.

It should be noted that the various features, functionalities, and designs of the controllers 600, 900, 1000 and 1110 may be integrated in various portions into a controller system incorporating some or all of the features, functionalities, and designs disclosed in relation to each system.

Figure 12:
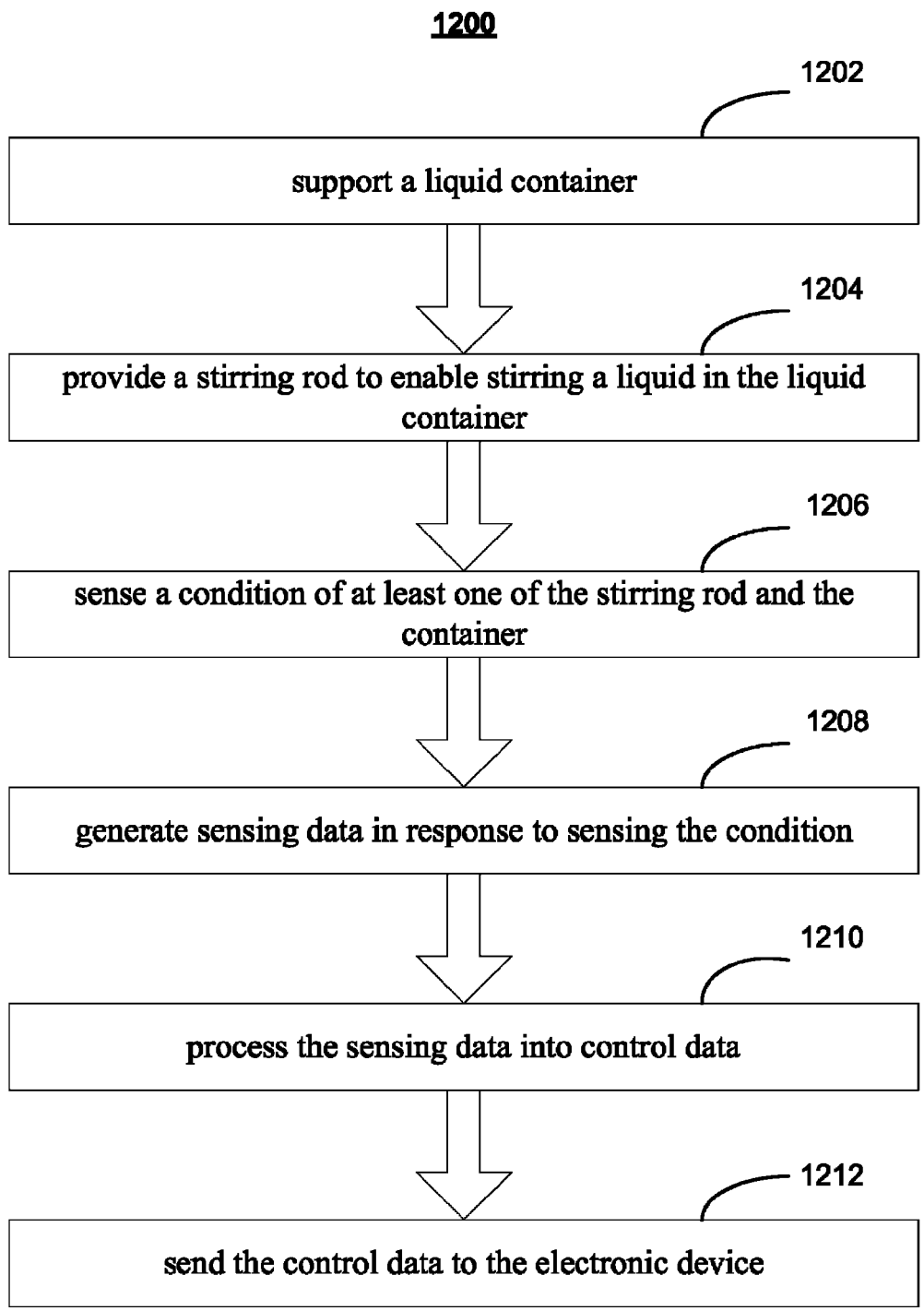
FIG. 12 shows a flow diagram of a method for controlling an electronic device using a controller system according to an illustrative embodiment of the invention.

FIG. 12 shows a flow diagram 1200 of a method for controlling an electronic device using a remote controller system according to an illustrative embodiment of the invention. The flow diagram 1200 includes steps 1202, 1204, 1206, 1208, 1210 and 1212. At step 1202, a platform may be configured to support a liquid container. At step 1204, the remote controller system may provide a stirring rod to enable stirring a liquid in the liquid container. At step 1206, at least one sensor may sense a condition of at least one of the stirring rod and the container. At step 1208, the remote controller system may generate sensing data in response to sensing the condition. At step 1210, a processor of the remote controller system may process the sensing data into control data. At step 1212, the remote controller system may send the control data to the electronic device.

Figure 13:
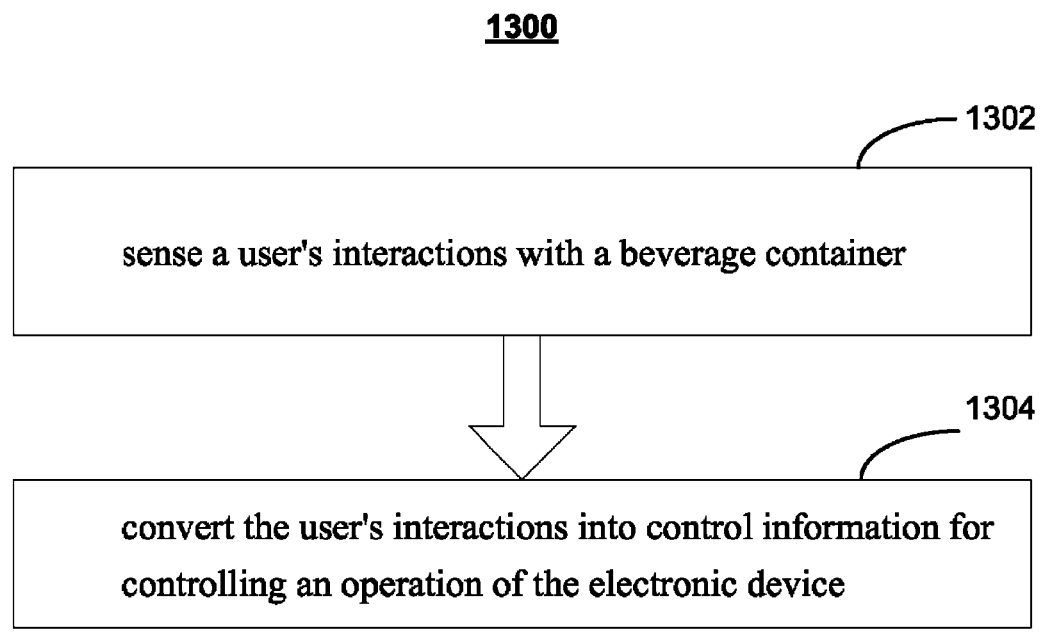
FIG. 13 shows a flow diagram of another method for controlling an electronic device using a controller system according to an illustrative embodiment of the invention.

FIG. 13 shows a flow diagram 1300 of another method for controlling an electronic device using a remote controller system according to an illustrative embodiment of the invention. The flow diagram 1300 includes steps 1302 and 1304. At step 1302, the remote controller system may sense a user's interactions with a beverage container. At step 1304, the remote controller system may convert the user's interactions into control information for controlling an operation of the electronic device.

Figure 14:
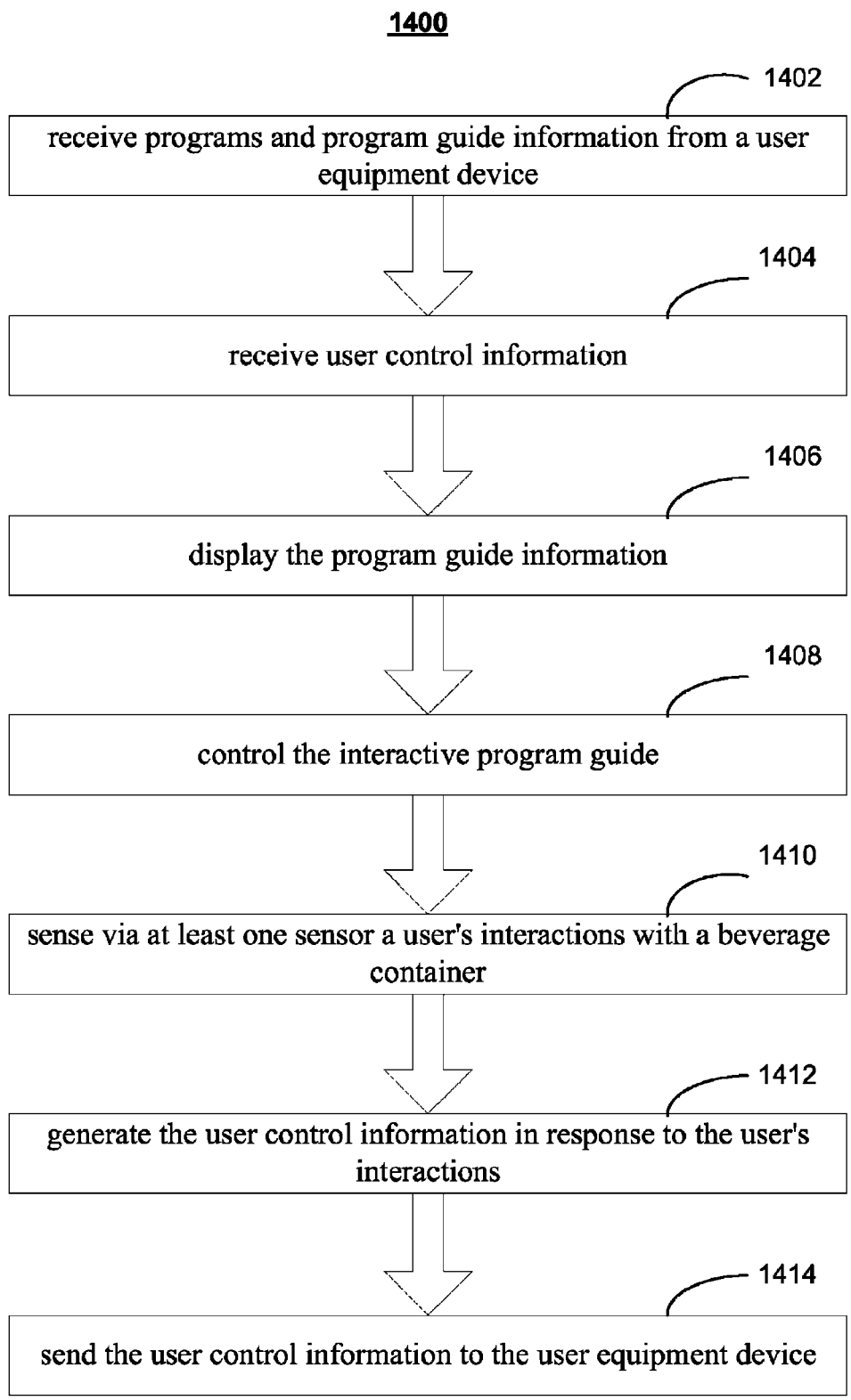
FIG. 14 shows a third flow diagram of a further method for controlling an electronic device using a controller system according to an illustrative embodiment of the invention.

FIG. 14 shows a flow diagram 1400 of a further method for controlling an electronic device using a remote controller system according to an illustrative embodiment of the invention. Flow diagram 1400 includes steps 1402, 1404, 1406, 1408, 1410, 1412, and 1414. At step 1402, an interactive program guide system may receive programs and program guide information from a user equipment device. At step 1404, the system may further receive user control information. At step 1406, the system may be configured to display the program guide information. At step 1408, the system may control the interactive program guide by first sensing via at least one sensor a user's interactions with a beverage container (step 1410), generating the user control information in response to the user's interactions (step 1412), and sending the user control information to the user equipment device (step 1414).

The above described embodiments of the present invention are presented for purposes of illustration and not of limitation, and the present invention is limited only by the claims which follow.

What is claimed is:

1. A remote control apparatus for a media device comprising:
   a platform for supporting a liquid container;
   a stirring rod for stirring a liquid in the liquid container; and
   a controller including:
      at least one sensor for sensing a condition of at least one of the stirring rod and the container;
      a communications interface for sending control data to the media device for executing a media guidance function on the media device; and
      a processor, in communication with the at least one sensor and the communications interface, configured for i) receiving sensor data from the at least one sensor, ii) processing the sensor data into the control data, and iii) sending the control data to the communications interface.

2. The apparatus of claim 1, wherein the platform includes a portion of the controller.

3. The apparatus of claim 1, wherein the platform includes a coaster.

4. The apparatus of claim 1, wherein the at least one sensor includes one of a reed relay, a magnetic sensor, a hall effect sensor, an acoustic sensor, a pressure sensor, a weight sensor, an accelerometer, a proximity sensor, an optical sensor, a temperature sensor, and a location sensor.

5. The apparatus of claim 1, wherein the control data is based on at least one of pressure data, acoustic data, position data, location data, movement data, weight data, volume data, and orientation data associated with at least one of the container and the stirring rod.

6. The apparatus of claim 1, wherein the sensor data is based on at least one of pressure, position, location, movement, weight, volume, and orientation associated with at least one of the container and the stirring rod.

7. The apparatus of claim 1, wherein the communications interface includes at least one of a wireless interface, an infrared interface, and a wired interface.

8. The apparatus of claim 1, wherein the control data is used to control an operation of the media device.

9. The apparatus of claim 1, wherein the at least one sensor includes a microphone for detecting a sound generated by a user.

10. The apparatus of claim 9, wherein the sound results from the user contacting the stirring rod with another object.

11. The apparatus of claim 1, wherein the platform includes a top surface in communication with the at least one sensor.

12. The apparatus of claim 1, wherein the container includes a cup and wherein the at least one sensor is configured to sense an amount of liquid in the cup.

13. The apparatus of claim 12, wherein the control data includes information based on the amount of liquid in the cup.

14. The apparatus of claim 1, wherein the liquid container includes a portion of the controller.

15. A method for controlling a media device using a remote controller comprising:
   supporting a liquid container;
   providing a stirring rod to enable stirring a liquid in the liquid container;
   sensing a condition of at least one of the stirring rod and the container;
   generating sensing data in response to sensing the condition;
   processing the sensing data into control data for executing a media guidance function on the media device;
   sending the control data to the media device.

16. The method of claim 15 comprising using a platform for supporting the container.

17. The method of claim 16, wherein the platform includes a top surface in communication with at least one sensor.

18. The method of claim 15, wherein the platform includes a coaster.

19. The method of claim 15 comprising using at least one sensor for sensing, the at least one sensor including one of a reed relay, a magnetic sensor, a hall effect sensor, an acoustic sensor, a pressure sensor, a weight sensor, an accelerometer, a proximity sensor, an optical sensor, a temperature sensor, and a location sensor.

20. The method of claim 15, wherein the control data is based on at least one of pressure data, acoustic data, position data, location data, movement data, weight data, volume data, and orientation data associated with at least one of the container and the stirring rod.

21. The method of claim 15, wherein the sensor data is based on at least one of position, location, movement, weight, volume, and orientation associated with at least one of the container and the stirring rod.

22. The method of claim 15, wherein the sending of control data is via at least one of a wireless interface, an infrared interface, and a wired interface.

23. The method of claim 15 comprising controlling an operation of the media device using the control data.

24. The method of claim 15, wherein sensing is via at least one sensor that includes a microphone for detecting a sound generated by a user.

25. The method of claim 24, wherein the sound results from the user contacting the stirring rod with another object.

26. The method of claim 15, wherein the container includes a cup and wherein the sensing includes sensing an amount of liquid in the cup.

27. The method of claim 26, wherein the control data includes information based on the amount of liquid in the cup.

28. A user interface system for controlling a media device comprising:
a sensor for sensing a user's interactions with a beverage container; and
a processor for converting the user's interactions into control information for executing a media guidance function on the media device.

29. The system of claim 28, wherein a portion of the system is included in the media device.

30. The system of claim 28, wherein the system is located remotely from and in communication with the media device.

31. The system of claim 30, wherein the system communicates wirelessly with the media device.

32. The system of claim 28, wherein the user's interactions include at least one of drinking from the container, lifting the container, stirring the beverage clockwise, stirring the beverage counter-clockwise, tapping the container, tapping the container with a stirring rod, the temperature of the beverage, amount of beverage in the container, the weight of the container, and a change in a condition of the container.

33. The system of claim 32, wherein each of the one or more of the user's interactions is associated with a selected operation of the media device such that the media device operation is in response to each of the one or more of the user's interactions.

34. The system of claim 28, wherein the sensor is included on a platform, the platform being configured to support the beverage container.

35. The system of claim 34, wherein the platform includes a coaster.

36. The system of claim 28, wherein the media device includes an interactive program guide.

37. A method for controlling a media device comprising:
sensing a user's interactions with a beverage container; and
converting the user's interactions into control information for executing a media guidance function on the media device.

38. The method of claim 37, wherein a portion of the sensing and the converting is performed in the media device.

39. The method of claim 37, wherein the sensing and the converting are performed remotely from the media device.

40. The method of claim 39 comprising sending the control information wirelessly to the media device.

41. The method of claim 37, wherein the user's interactions include at least one of drinking from the container, lifting the container, stirring the beverage clockwise, stirring the beverage counter-clockwise, tapping the container, tapping the container with a stirring rod, the temperature of the beverage, amount of beverage in the container, the weight of the container, and a change in a condition of the container.

42. The method of claim 41, wherein each of the one or more of the user's interactions is associated with a selected operation of the media device such that the media device operation is in response to each of the one or more of the user's interactions.

43. The method of claim 37 comprising receiving the sensed user's interactions via a sensor included on a platform configured to support the beverage container.

44. The method of claim 37, wherein the platform includes a coaster.

45. The method of claim 37, wherein the media device includes an interactive program guide.

46. An interactive program guide system comprising:
a media device configured for i) receiving programs and program guide information and ii) receiving user control information to execute a media guidance function on the media device;
a display for displaying the program guide information; and
a first controller including:
at least one sensor for sensing a user's interactions with a tool; and
a processor for generating the user control information in response to the user's interactions; and
a communications interface for sending the user control information to the media device.

47. The system of claim 46 comprising a second remote controller for receiving user inputs via a user interface and sending the user control information to the media device.

48. The system of claim 46, wherein the first remote controller includes a platform for supporting the liquid container and a stirring rod for stirring a liquid in the beverage container.

49. A method for interacting with an interactive program guide comprising:
receiving programs and program guide information at a media device;
receiving user control information to execute a media guidance function on the media device;
displaying the program guide information; and
controlling the interactive program guide by:
sensing via at least one sensor a user's interactions with a tool;
generating the user control information in response to the user's interactions; and
sending the user control information to the media device.

50. The method of claim 49 comprising receiving user inputs from a second remote controller via a user interface and sending the user control information to the media device.

51. The method of claim 49, wherein the first remote controller includes a platform for supporting the liquid container and a stirring rod for stirring a liquid in the beverage container.

* * * * *